(12) United States Patent
Guthery et al.

(10) Patent No.: US 10,560,410 B2
(45) Date of Patent: *Feb. 11, 2020

(54) METHOD AND SYSTEM FOR COMMUNICATING BETWEEN A SENDER AND A RECIPIENT VIA A PERSONALIZED MESSAGE INCLUDING AN AUDIO CLIP EXTRACTED FROM A PRE-EXISTING RECORDING

(71) Applicant: Audiobyte LLC, Port Washington, NY (US)

(72) Inventors: Scott Guthery, Port Washington, NY (US); Richard Van Den Bosch, Port Washington, NY (US); Brian Vo, Port Washington, NY (US); Nolan Leung, Port Washington, NY (US); Andrew Blacker, Port Washington, NY (US); John Van Suchtelen, Port Washington, NY (US)

(73) Assignee: Audiobyte LLC, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,854

(22) Filed: May 24, 2019

(65) Prior Publication Data
US 2019/0306100 A1    Oct. 3, 2019

Related U.S. Application Data

(63) Continuation-in-part of application No. 15/973,822, filed on May 8, 2018, now Pat. No. 10,333,876,
(Continued)

(51) Int. Cl.
*G10L 15/00*    (2013.01)
*H04L 12/58*    (2006.01)
(Continued)

(52) U.S. Cl.
CPC .......... *H04L 51/10* (2013.01); *G06F 3/04842* (2013.01); *G06F 16/68* (2019.01);
(Continued)

(58) Field of Classification Search
CPC ....................................................... G10L 15/26
(Continued)

(56) References Cited

U.S. PATENT DOCUMENTS

| 5,799,276 A * | 8/1998 | Komissarchik | ......... G10L 15/04 |
| | | | 704/207 |
| 6,950,804 B2 * | 9/2005 | Strietzel | ............... G06Q 20/102 |
| | | | 705/14.49 |

(Continued)

OTHER PUBLICATIONS

International Search Report and Written Opinion issued for corresponding PCT/US2012/045302 dated Sep. 17, 2012; 7 pages.
(Continued)

*Primary Examiner* — Daniel C Washburn
*Assistant Examiner* — Timothy Nguyen
(74) *Attorney, Agent, or Firm* — Maier & Maier, PLLC

(57) ABSTRACT

A method, system, and software for communicating between a sender and a recipient via a personalized message. The communication can be in the form of a customized audio, video, or multimedia content. The content may be found in a database or uploaded by a user. Further, the content may be edited or customized in a variety of manners. The communications can take place between two users or among a number of users.

17 Claims, 23 Drawing Sheets

Related U.S. Application Data which is a continuation-in-part of application No. 15/786,119, filed on Oct. 17, 2017, now Pat. No. 10,200,323, which is a continuation-in-part of application No. 15/240,095, filed on Aug. 18, 2016, now Pat. No. 9,819,622, which is a continuation of application No. 15/042,677, filed on Feb. 12, 2016, now Pat. No. 9,813,366, which is a continuation of application No. 13/356,387, filed on Jan. 23, 2012, now Pat. No. 9,262,522.

(60) Provisional application No. 61/503,230, filed on Jun. 30, 2011.

(51) Int. Cl.

| | | |
|---|---|---|
| *G06F 16/683* | (2019.01) | |
| *G06F 16/68* | (2019.01) | |
| *G06Q 30/02* | (2012.01) | |
| *G10L 15/26* | (2006.01) | |
| *G06Q 20/26* | (2012.01) | |
| *G06F 3/0484* | (2013.01) | |
| *G06Q 40/00* | (2012.01) | |

(52) U.S. Cl.
CPC ........... *G06F 16/685* (2019.01); *G06Q 20/26* (2013.01); *G06Q 30/0273* (2013.01); *G06Q 40/12* (2013.12); *G10L 15/26* (2013.01); *H04L 51/04* (2013.01); *H04L 51/32* (2013.01)

(58) Field of Classification Search
USPC ........................................................ 704/235
See application file for complete search history.

(56) References Cited

U.S. PATENT DOCUMENTS

| 6,968,364 | B1* | 11/2005 | Wong ..................... H04N 5/765 |
| | | | 348/E7.071 |
| 7,199,300 | B2* | 4/2007 | Kodama ............... G06F 16/683 |
| | | | 84/601 |
| 7,973,230 | B2* | 7/2011 | Mahowald ............. G10H 1/368 |
| | | | 434/307 A |
| 8,311,823 | B2* | 11/2012 | Bloebaum ......... H04M 1/72522 |
| | | | 704/235 |
| 8,543,141 | B2 | 9/2013 | Meiby et al. |
| 2002/0082059 | A1* | 6/2002 | Nariai ............... H04W 52/0264 |
| | | | 455/573 |
| 2002/0120564 | A1* | 8/2002 | Strietzel ............... G06Q 20/102 |
| | | | 705/40 |
| 2003/0095550 | A1* | 5/2003 | Lewis ..................... H04L 29/06 |
| | | | 370/392 |
| 2004/0260470 | A1* | 12/2004 | Rast ....................... G06Q 10/06 |
| | | | 701/300 |
| 2005/0126371 | A1* | 6/2005 | Kodama ............... G06F 16/683 |
| | | | 84/636 |
| 2005/0281541 | A1 | 12/2005 | Logan et al. |
| 2006/0041505 | A1 | 2/2006 | Enyart |
| 2007/0166683 | A1* | 7/2007 | Chang ..................... G09B 5/06 |
| | | | 434/307 R |
| 2007/0276733 | A1 | 11/2007 | Geshwind et al. |
| 2008/0071752 | A1* | 3/2008 | Azuma ................... H04L 51/14 |
| 2008/0097754 | A1* | 4/2008 | Goto ....................... G10L 15/26 |
| | | | 704/214 |
| 2008/0147215 | A1* | 6/2008 | Kim ....................... G06F 16/68 |
| | | | 700/94 |
| 2008/0220797 | A1 | 9/2008 | Meiby et al. |
| 2009/0012849 | A1* | 1/2009 | Penrose Barton ..... G06Q 30/02 |
| | | | 705/14.19 |
| 2009/0051487 | A1* | 2/2009 | Sarig ................... G06F 19/3418 |
| | | | 340/5.52 |
| 2009/0165634 | A1* | 7/2009 | Mahowald ............. G10H 1/368 |
| | | | 84/610 |
| 2010/0306073 | A1* | 12/2010 | Young .................... G06Q 30/06 |
| | | | 705/26.1 |
| 2011/0196726 | A1* | 8/2011 | Poellnitz ................ G06Q 30/02 |
| | | | 705/14.16 |
| 2012/0004910 | A1* | 1/2012 | Quidilig ................. H04L 51/066 |
| | | | 704/235 |
| 2012/0159337 | A1* | 6/2012 | Travilla ............. G06Q 30/0631 |
| | | | 715/738 |
| 2012/0221975 | A1* | 8/2012 | Juristovski ............. G10H 1/365 |
| | | | 715/823 |
| 2014/0344956 | A1* | 11/2014 | Garben ................... G06F 21/10 |
| | | | 726/30 |

OTHER PUBLICATIONS

International Preliminary Report on Patentability for corresponding PCT/US2012/045302 dated Mar. 25, 2014; 6 pages.

* cited by examiner

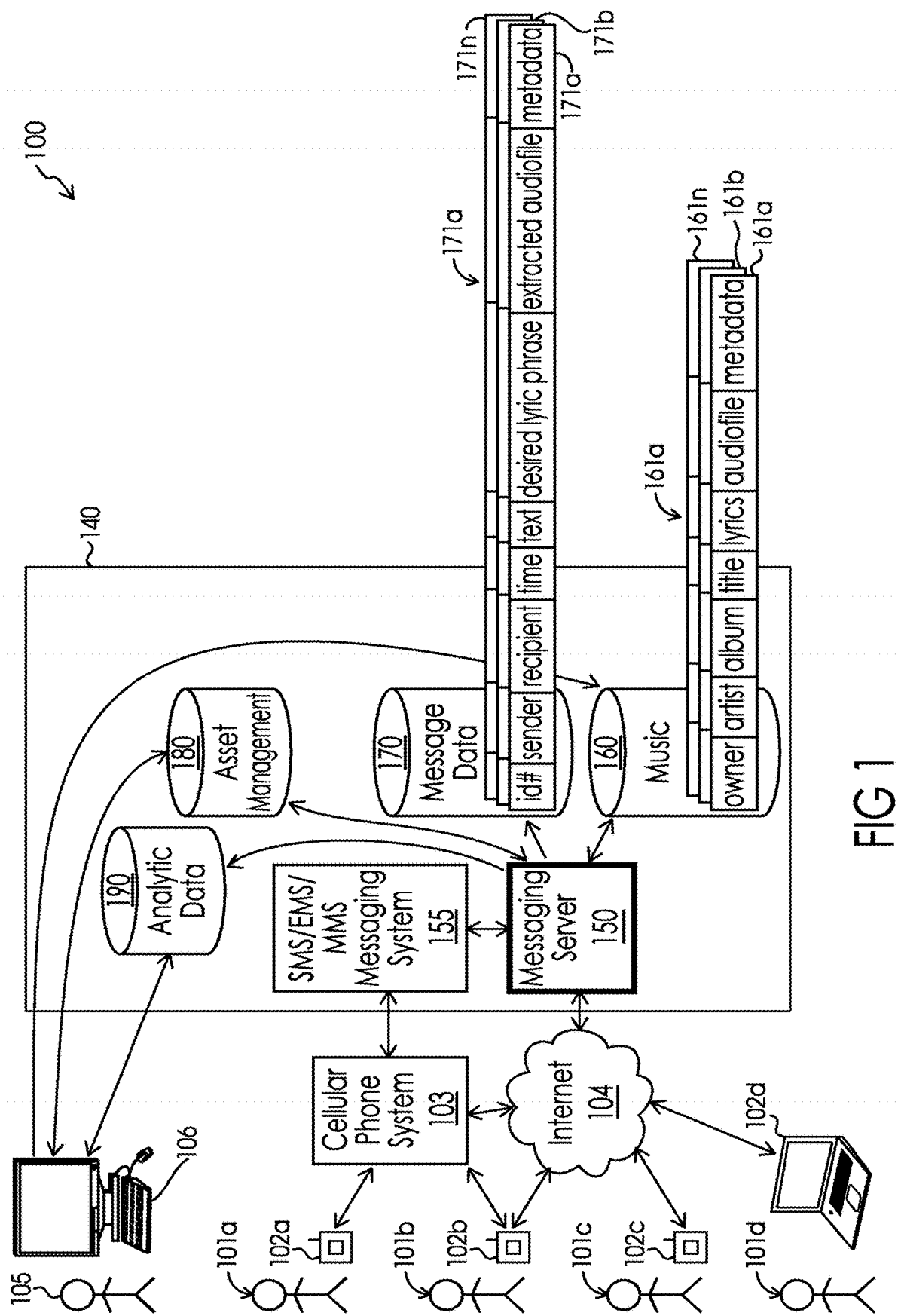

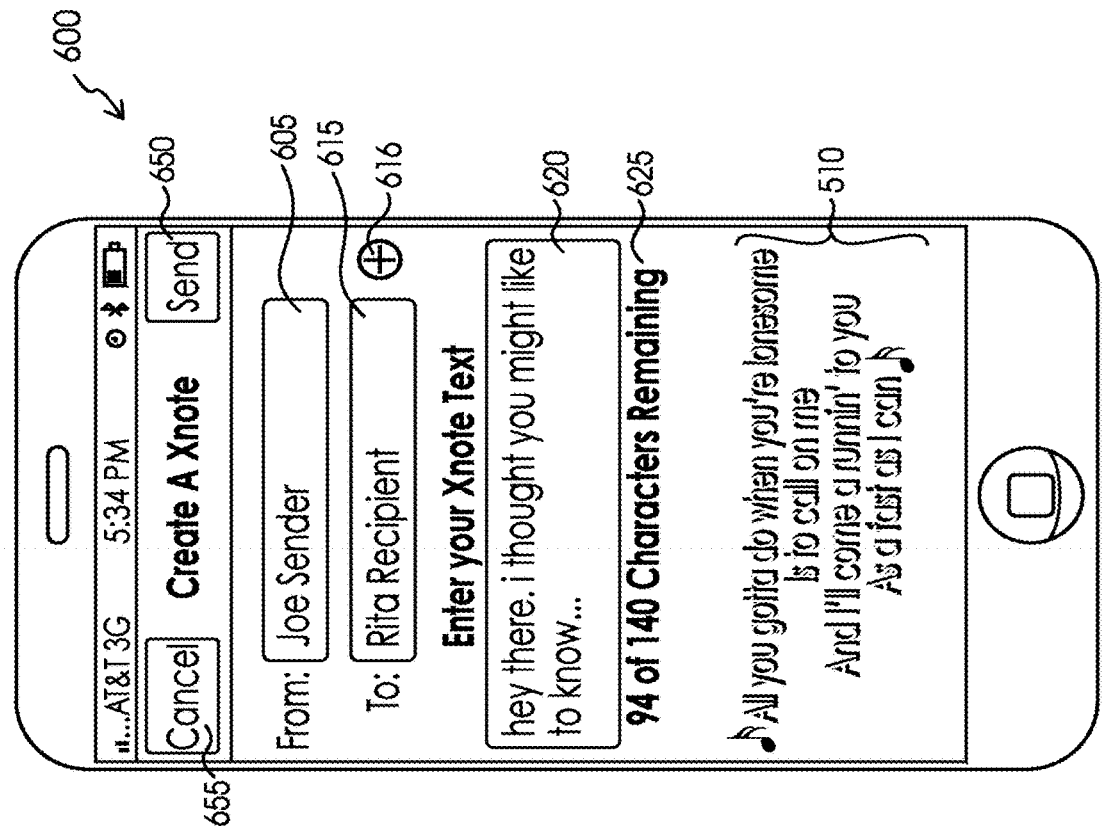
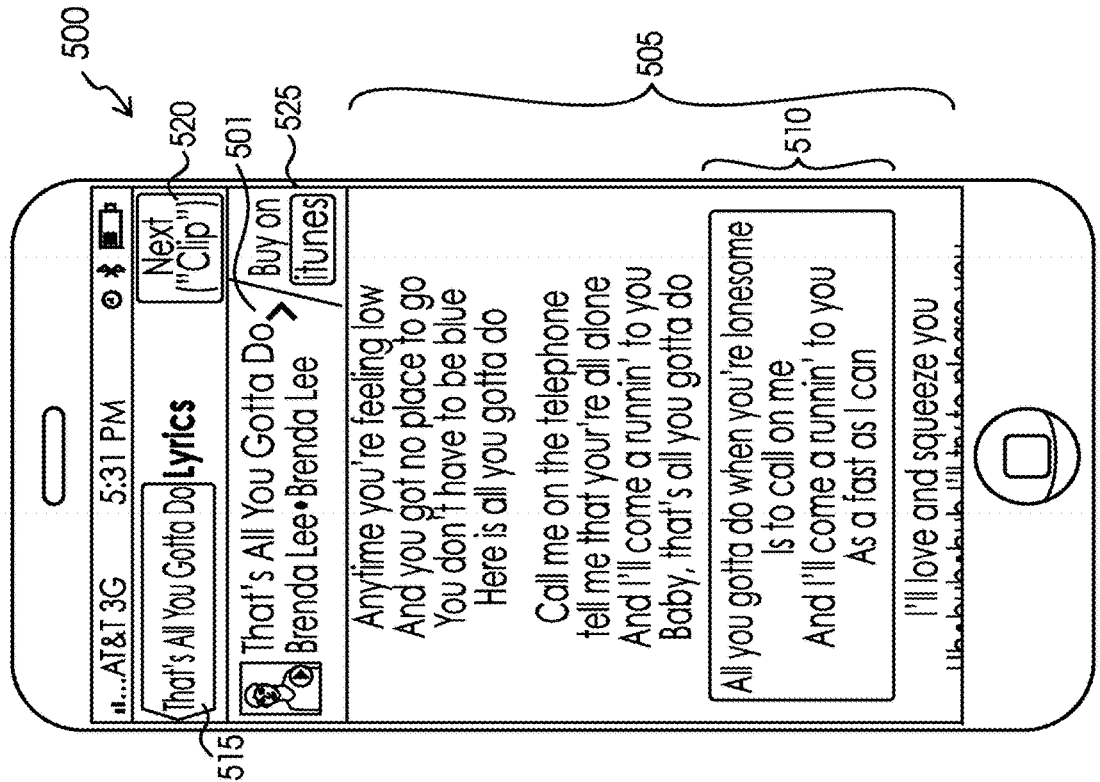
FIG 6
FIG 5

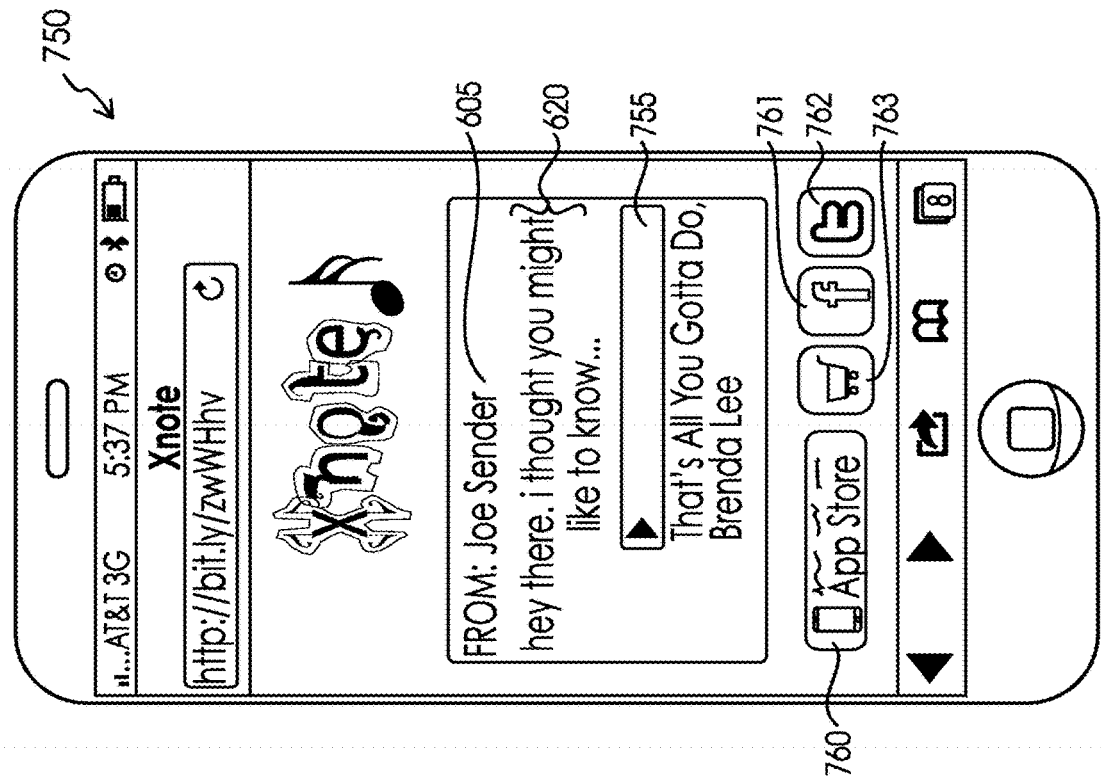
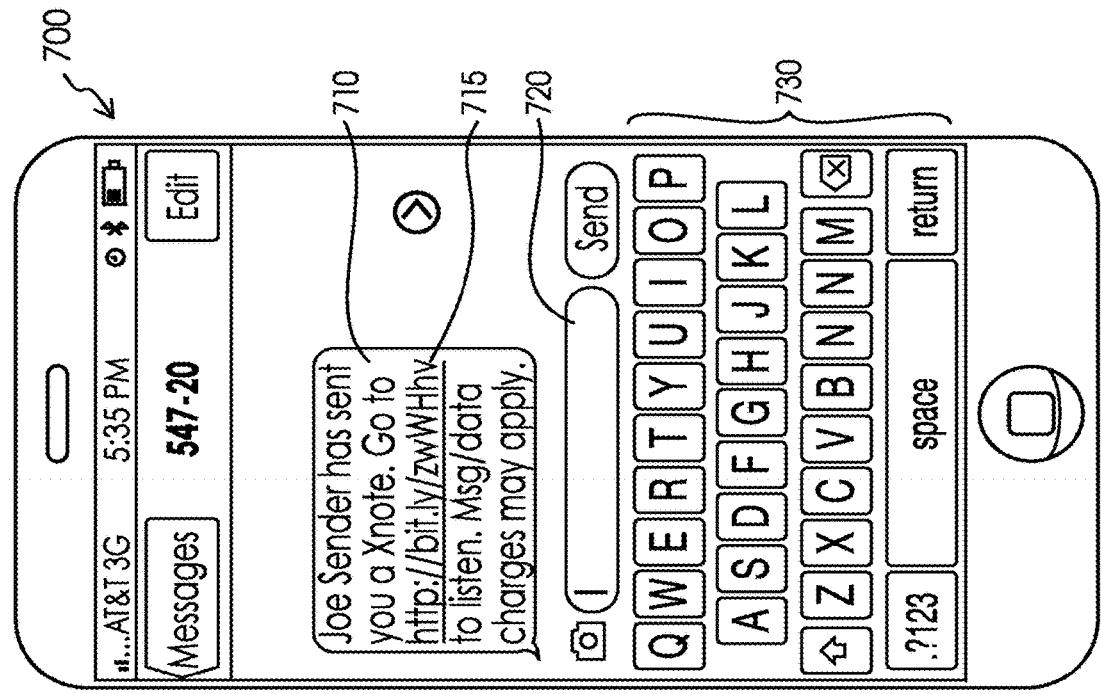

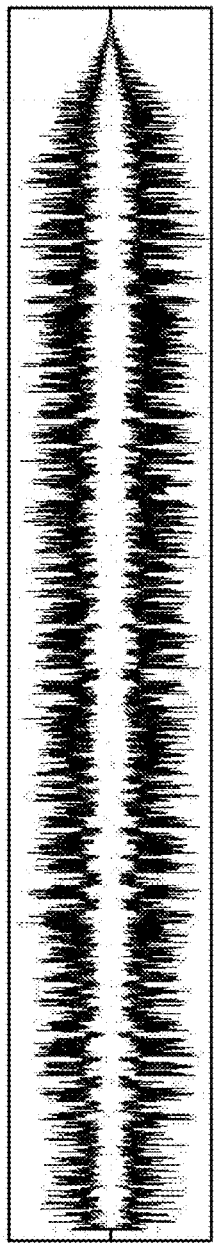
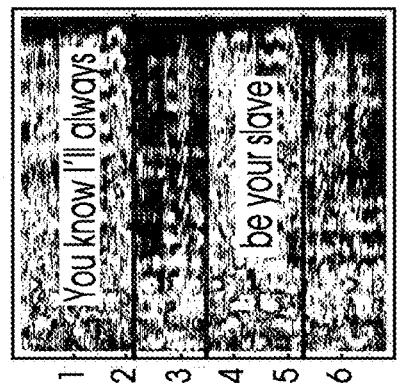
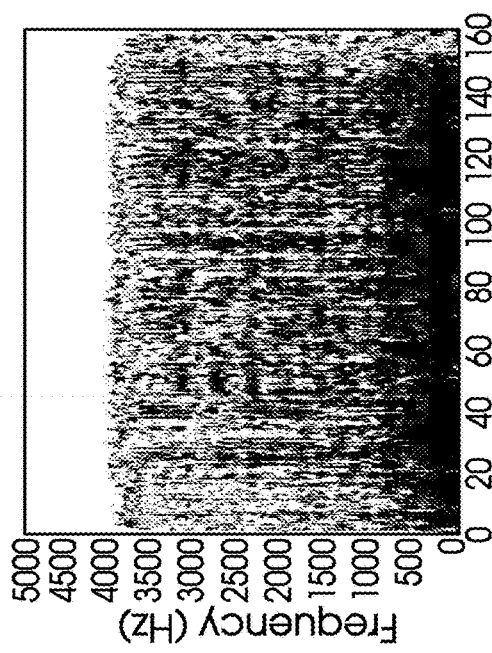
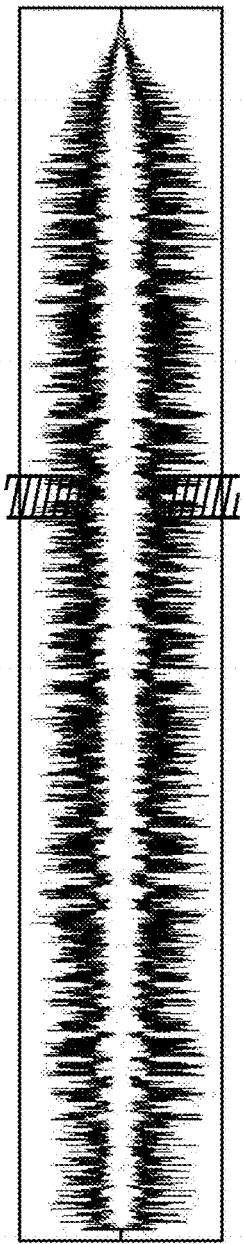
FIG 13A
FIG 13B
FIG 13C
FIG 13D

1700

1702

1704

1706

1700

1702

1704

1712

1800

1802

1804  Eric Church
Springsteen

1806

1900

.ıll ⎨   9:41 AM   ⁕ 100% ▆

Preview  Post to your Feed   Post  
1902  
1904  
  Write a Caption  
1906

MORE SHARING OPTIONS

Twitter     1910

1908

SEND A MESSAGE

Facebook

1912  SMS

Messenger

Instagram

More...

SAVE

Save to Camera Roll

1914  Email Rednote

METHOD AND SYSTEM FOR COMMUNICATING BETWEEN A SENDER AND A RECIPIENT VIA A PERSONALIZED MESSAGE INCLUDING AN AUDIO CLIP EXTRACTED FROM A PRE-EXISTING RECORDING

CROSS-REFERENCE TO RELATED APPLICATIONS

This application is a continuation-in-part of U.S. patent application Ser. No. 15/973,822, filed May 8, 2018 and entitled "Method and System for Communicating Between a Sender and a Recipient Via a Personalized Message Including an Audio Clip Extracted From a Pre-Existing Recording," which is a continuation-in-part of U.S. patent application Ser. No. 15/786,119, filed Oct. 17, 2017 and entitled "Method and System for Communicating Between a Sender and a Recipient Via a Personalized Message Including an Audio Clip Extracted From a Pre-Existing Recording," which is a continuation-in-part of U.S. patent application Ser. No. 15/240,095, filed Aug. 18, 2016, and entitled "Method and System for Communicating Between a Sender and a Recipient via a Personalized Message Including an Audio Clip Extracted from a Pre-Existing Recording," which is a continuation of U.S. patent application Ser. No. 15/042,677, filed Feb. 12, 2016, and entitled "Method and System for Communicating Between a Sender and a Recipient via a Personalized Message Including an Audio Clip Extracted from a Pre-Existing Recording," which is a continuation of U.S. patent application Ser. No. 13/356,387, now U.S. Pat. No. 9,262,522, filed Jan. 23, 2012 and entitled "Method and System for Communicating Between a Sender and a Recipient via a Personalized Message Including an Audio Clip Extracted from a Pre-Existing Recording," which claims priority from U.S. Provisional Patent Application No. 61/503,230, filed on Jun. 30, 2011, entitled "Locating a Lyric Phrase in a Digital Music Recording," the entire contents of which are hereby incorporated by reference.

FIELD

The present invention relates generally to interaction with digital audio, and more particularly to a method and system for communicating between a sender and a recipient via a personalized message including an audio clip associated with a desired lyric phrase extracted from a pre-existing recording as well as the associated method and system for locating the portion of the audio file containing the desired lyric and creating a digital file from that segment.

BACKGROUND

Consumers are purchasing digital music and products to augment their digital music libraries at unprecedented rates. A combination of better music management and evolving digital rights management has created an environment where more music than ever is available legally, and creative tools to use that music are easily accessible.

An emotion may be felt by one individual toward another or it can be shared between two or more individuals. For many reasons, recordings may encapsulate many emotions. For example, the recording of an opera may contain emotions of the various roles in the opera. Expressing an emotion by singing a song can be traced back at least to the troubadours of the High Middle Ages (1100-1350). Song lyrics are crafted to describe a human emotion in a succinct and precise manner. The music encapsulating an emotive lyric shades and intensifies the description. The analog of the troubadour in the modern age is to communicate the emotion by sending a recording of the song encapsulating the emotion. However, the market offerings for creating a snippet of song that represents a particular emotion or set of feelings are scarce. Existing services have categorized a limited number of audio files harvested from various public Internet sites. Often the harvested files do not include the entire original work. Frequently, the harvested files were unlicensed copies themselves and many times the audio quality is poor. Thus, there is a need for a service that can provide access to licensed audio that allows for the clipping of that audio into licensed clips, so that users and providers associated with these transactions are not in violation of copyright laws. Involvement with an unlicensed system could damage the businesses reputation and that of any sponsors.

Existing services require that a user listen to the entire audio file (or prior users' previously created clips) to determine a clip start and stop time for a portion of the song they wish to clip. There have long been means and methods for a human operator to examine a digital recording and to clip a pre-specified lyric phrase out of the recording. There are, for example, recording studios that contain hardware devices for the editing of recorded music including listening to the music and clipping out certain segments of recordings. There are also software programs that enable the user to listen to digitally recorded music on a home computer and to clip out segments from digital media. Many of these options require access to specialized hardware and/or software and may further require the user to possess the expertise to operate the hardware and/or software to achieve the desired result. The few generally available options are cumbersome, which makes creating the audio clips time-consuming and difficult, particularly for novice users.

There is a need in the art to provide users with a way to find the specific feeling they are looking to express from within the music. There is an associated need to provide selectable lyrics that may be preferably searchable. There is a further desire to provide potentially easier alternatives to quickly locate a desired portion of a song.

Accordingly there is a need for a system that would provide even novice users the functionality to identify a recording containing a desired lyric phrase, get a clip of that lyric phrase and facilitate the transmission of that audio clip via email, text, IM or other means of electronic—particularly one-to-one (or peer-to-peer) communication as opposed to one-to-many sites that allow users to post song segments that are meaningful to them.

Mobile phone use and music consumption and involvement show a concrete connection that has experienced rapid growth much along the lines of mobile messaging services. A 2010 Pew Research study indicated that 33% of mobile subscribers use their phone for music—that number is 3% more than those who use instant messaging and 4% more than application use. Consumers will come to know and expect richer communication experiences from their smartphones. Thus, there is an opportunity to leverage this mobile phone usage for musical playback and messaging.

Many e-greeting services have already taken advantage of increasing mobile internet use. Industry experts predict that mobile greetings including unique services for youth, dating and special interests will generate over $100 M in revenue between 2010 and 2013. However, none of these e-greeting services have filled the needs noted above.

SUMMARY

The present disclosure teaches various inventions that address, in part (or in whole) these and other various desires in the art. Those of ordinary skill in the art to which the inventions pertain, having the present disclosure before them will also come to realize that the inventions disclosed herein may address needs not explicitly identified in the present application. Those skilled in the art may also recognize that the principles disclosed may be applied to a wide variety of techniques involving communications, marketing, reward systems, and social networking.

First, approaching the present invention at a high, more consumer-oriented level, imagine that an end user (a sender) using their smartphone could select and then clip a line or two from their favorite pre-existing song or other pre-existing recording and send it electronically to a friend to let them know how the sender is feeling at that moment. These "snippets" of songs may typically last less than 19 seconds (but may range from one second to 29 seconds and even longer) and can be thought of as a "musical emoticon" . . . a way to send thoughts and feelings.

The audio "snippet" may be sent to a recipient's text, chat, or email conversation via mobile phone, tablet device, or computer. In one embodiment, an end user receives a custom message (which may be using a short code (e.g. 547-20)) telling them that their friend has sent them a message with an audio clip. In one approach, a link is included in the message; when the end user clicks on the link they are taken to a system landing page where they will see their friend's personalized message and play the audio clip. The recipient may then be provided with the option of sharing the audio clip with other friends, purchasing the entire song, or going to the system website to learn more about the artist. In IM Chat and email conversations, users simply click on the link to arrive at the system landing page. The recipient of the audio clip may click on a link to be connected to a streaming server that takes the recipient to a landing page that displays a custom message sent by their friend and play the brief audio clip created by the friend.

In one approach, an Application Programming Interface (API) may be used to integrate the inventive method and system with preexisting music catalog software (e.g. iTunes, Rhapsody, Pandora). The API catalogs, constructs and delivers a short portion of a song that is relevant to a consumer's electronic communication with a friend. The API offers a live data gathering approach to collect and sanitize current music offerings from a variety of catalogs and repositories.

In some approaches, a central clearinghouse may be used to organize the sampling of each pre-existing song to create an audio database for the system as well as the purchasing opportunities for a particular full version of the song. The system and method may also include analytics, digital rights management and purchasing flows. Among other things, streaming technology allows the system to fully account for each streamed snippet while minimizing, if not removing, the threat of piracy.

In a system intended to support this transmission of musical emoticons, the pre-existing recordings may be identified by any number of attributes including, but not limited to, the artist, title, musical genre, speed, lyrics, as well as other variables, which may be included, for instance, in metadata.

To this end, the present disclosure teaches, among other things, a method of communicating between a sender and a recipient via a personalized message created by the sender on a communication device. The method may include identifying text, via a user interface on or associated with the communication device, of a desired lyric phrase from within a pre-existing recording; extracting the audio substantially associated with the desired lyric phrase from the pre-existing recording into a desired audio clip via a substantially automated process; providing an electronic address for the recipient; inputting personalized text or spoken words via the user interface; creating the personalized message with the sender identification, the personalized text and access to the desired audio clip; and sending an electronic message to the electronic address of the recipient. The sent electronic message may be an SMS/EMS/MMS/IM or email message including a link to the personalized message or an EMS/MMS or email message comprised of the personalized message, itself. Further, while exemplary embodiments may refer to one-to-one messaging, it is appreciated that any exemplary embodiment described herein could be utilized in a group messaging environment or a one-to-many messaging or communication environment. Creating the personalized message may further include saving the desired audio clip in a storage facility not controlled by either the sender or the recipient; and providing a handle to the desired audio clip in the personalized message.

The method may further include creating an account for the sender; associating the sender account with funds; and deducting from the funds associated with the sender account upon the occurrence of a predetermined event. The predetermined event may be sending the electronic message; the recipient accessing the handle of the audio snippet; or even the successful receipt of the electronic message. The amount of funds/credits deducted from the sender account may be based upon who the publisher/owner/controlling agent is of the pre-existing recording.

Where sending the electronic message is controlled by an administrator and the pre-existing recording is controlled by a publisher, creating the personalized message may further include providing a link to a web page controlled by the publisher that offers the pre-existing recording; and associating the link with the administrator so that the publisher pays the administrator if the recipient purchases the pre-existing recording from the web page.

Identifying text may require the sender to search for the desired lyric phrase within one or more pre-existing recordings. The lyrics may be generated for use in the system using a speech-to-text conversion program on the pre-existing recording. The method may include means to assist the sender in searching such as means for selecting an emotion from a list of possible emotions; and displaying the one or more pre-existing recordings pre-associated with the selected emotion. The method may include other search aids such as playing back at least a portion of one or more pre-existing recordings via the user interface. Where extracting the audio substantially associated with the desired lyric phrase was used to further create lyrics synchronized to the pre-existing recording, playing back the portion of one or more pre-existing recordings may include displaying lyrics associated with the portion of the one or more pre-existing recordings on the user interface.

The substantially automated process for extracting audio substantially associated with the desired lyric phrase from the pre-existing recording into the desired audio clip may include: applying the adjusted best-suited wavelet template to the pre-existing recording to form a time-by-frequency matrix; detecting vocal/non-vocal edges in the time-by-frequency matrix; establishing vocal intervals based on the detected edges; mapping lyrics for the pre-existing recording onto the established vocal intervals; and extracting the desired audio clip by matching the desired lyric phrase to one of the established vocal intervals based on the mapping. This extraction method may further include analyzing the pre-existing recording to select the best-suited wavelet template for the pre-existing recording; and adjusting the parameters of the best-suited wavelet template.

The invention may further include a system for communicating between a sender and a recipient via a personalized message created by the sender via a communication device. The system including a music database containing a plurality of pre-existing recordings; a sender user interface in operable communication with the communication device, capable of displaying or outputting the plurality of pre-existing recordings in the music database and lyrics associated with each of the plurality of pre-existing recordings, the sender user interface supporting (a) identification by the sender of a desired lyric phrase found within one of the plurality of pre-existing recordings, (b) entry of an electronic address of the recipient and (c) entry of a personalized text or words; an audio extraction engine operably associated with the music database and the sender user interface to extract audio substantially associated with the desired lyric phrase found within one of the plurality of pre-existing recordings into a desired audio clip; and a message generator for generating the personalized message including the sender identification, the personalized text and access to the desired audio clip and for saving the personalized message in a message database. The electronic message may be an SMS/EMS/MMS/IM or email message including a link to the personalized message or an EMS/MMS or email message comprised of the personalized message. The message may be a one-to-one message, a one-to-many message, group message, posting that may be accessed by one or more people, or the like, as desired.

The audio extraction engine may use a time-by-frequency matrix to detect vocal/non-vocal edges and thus establish likely vocal intervals, maps lyrics for the pre-existing recording onto the established likely vocal intervals and then extracts the desired audio clip by matching the desired lyric phrase to one of the established vocal intervals based on the mapping.

The system may further include an asset management database containing a sender account for each sender, each sender account being associated with funds. The asset management database may further contain accounts for one or more sponsors, each sponsor account including a sponsor brand image and sponsor allocated funds, wherein the funds associated with each sender account are the sponsor allocated funds.

The system may also include an analytic engine for monitoring events generated by at least one of the sender user interface, the message generator, the recipient user interface. Among other things, the analytic engine may determine whether a predetermined event has occurred, which could be sending an electronic message to a recipient; the successful receipt of the electronic message by the recipient; or the recipient accessing the desired audio clip.

The sender user interface may support searching for the desired lyric phrase within the plurality of pre-existing recordings in the music database. That search interface may support searching for the desired lyric phrase by providing an interface that facilitates the selection of an emotion from a displayed or spoken list of possible emotions and then displays one or more pre-existing recordings pre-associated with the selected emotion.

In some exemplary embodiments, it may further be desired to match an audio recording with an image or video file, for example a static image file or a dynamic image file such as an animated GIF. According to an exemplary embodiment, a user may be able to create or select one or more visual media files from a list of visual media files, and may be able to pair the visual media file with an audio media file (such as the short snippet of the recording that would otherwise have been provided in an audio message) in order to form an audiovisual message file. The user may then be able to customize this audiovisual message further by providing text lyrics on the visual media file, editing the attributes of the text lyrics provided on the visual media file such as the font of the lyrics or the color in which the lyrics are provided (or any other attributes of the lyrics such as the font size or placement of the text lyrics), editing the lengths of audio and/or video clips, stringing together audio and/or video clips, generating a preview image that the user can use in order to review all of their edits to the resulting video file or audiovisual message note, and may then send the audiovisual message note, post it, or save it locally to be sent later.

To this end, the present disclosure teaches, among other things, a method of communicating between a sender and a recipient via a personalized message created by the sender on a communication device. The method may include identifying text, via a user interface on the communication device, of a desired lyric phrase from within a pre-existing recording; selecting an image or video file to be associated with the desired lyric phrase; extracting the audio substantially associated with the desired lyric phrase from the pre-existing recording into a desired audio clip via a substantially automated process; providing an electronic address for the recipient; inputting personalized text via the user interface; creating the personalized message with the sender identification, the personalized text, access to the visual media file, and access to the desired audio clip; and sending an electronic message to the electronic address of the recipient. The sent electronic message may be an SMS/EMS/MMS/IM or email message including a link to the personalized message or an EMS/MMS or email message which may include the personalized message, itself (for example as an attachment). Creating the personalized message may further include saving the desired audio clip in a storage facility not controlled by either the sender or the recipient; and providing a handle to the desired audio clip in the personalized message.

In some exemplary embodiments, a list of visual media files, a list of audio files, or a list of audiovisual files may be generated by a relevance determination system. According to an exemplary embodiment, a relevance determination system may calculate a relevance score for visual media files, audio files, and/or audiovisual files, and may then create one or more audiovisual files for use in audiovisual message files by combining relevant audio/visual/audiovisual files. For example, an exemplary embodiment of a relevance determination system may associate pairs of GIF image files and audio clips that are determined to be relevant to one another.

These and other advantages and uses of the present system and associated methods will become clear to those of ordinary skill in the art after reviewing the present specification, drawings, and claims.

BRIEF DESCRIPTION OF THE FIGURES

For a better understanding of the present disclosure, non-limiting and non-exhaustive embodiments are described in reference to the following drawings. In the drawings, like reference numerals refer to like parts through all the various figures unless otherwise specified.

FIG. 1 illustrates one embodiment of a system 100 that may be utilized accordance with one or more potential approaches to the present invention.

FIG. 5 illustrates one potential aspect of the deployment of the system 100 on one particularly illustrative smartphone-based user interface depicting, in particular, a user interface for identifying text of a desired lyric phrase from a pre-existing recording to facilitate extraction of the desired audio snippet from the pre-existing recording.

FIG. 6 illustrates one potential aspect of the deployment of the system 100 on one particularly illustrative smartphone-based user interface depicting, in particular, a user interface for inputting personalized text to be included in the personalized message.

FIG. 7 illustrates the receipt by the recipient on an illustrative communication device (i.e. smartphone) of an electronic message including a link to the personalized message created by the sender as automatically created and sent by system 100 in the form of a text (e.g. SMS/EMS/MMS) message.

FIG. 7A illustrates the state of the recipient's illustrative communication device (i.e. smartphone) after clicking on the link in the electronic message automatically created and sent by system 100 in the form of a text (e.g. SMS/EMS/MMS) message as illustrated in FIG. 7, depicting the personalized message created by the sender as generated in association with the recipient user interface of messaging server 150 of FIG. 1.

FIG. 13A is a pictogram of the time-domain audio signal of a pre-existing recording of "Bring It On Home to Me©" as sung and recorded by Sam Cooke.

FIG. 13B is an illustration of the frequency domain version of the time-domain audio signal illustrated in FIG. 13A created using a Blackman wavelet.

FIG. 13C is a close up view of a portion of the frequency-domain illustration of FIG. 13B showing the vocal intervals and superimposed lyrics mapped onto the established vocal intervals at the portion of the desired lyric phrase in Example 1 in the Specification.

FIG. 13D is the same pictogram of the time-domain audio signal of a pre-existing recording of "Bring It On Home to Me©" as in FIG. 13A with the desired audio clip indicated by a selected region in the figure.

Figure 1A:
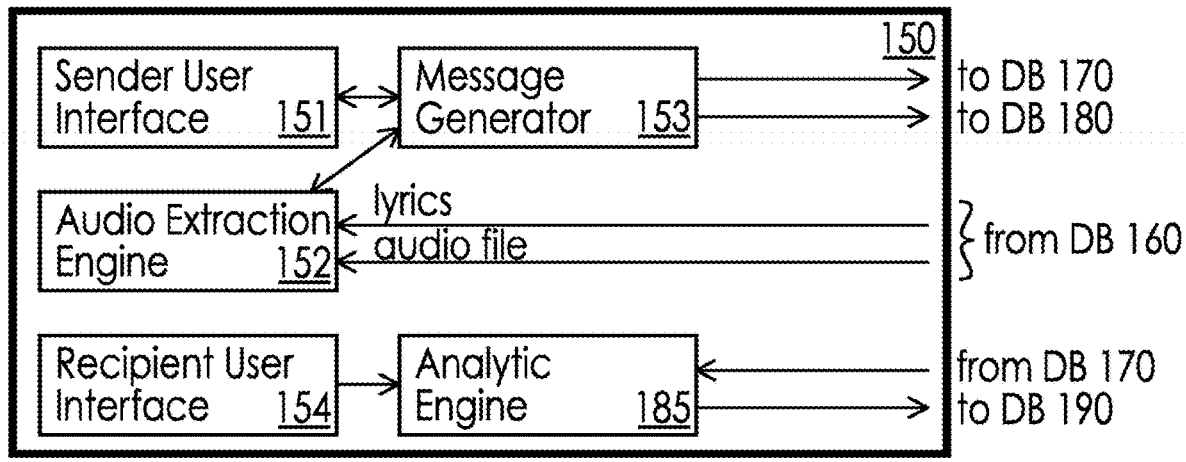
FIG. 1A illustrates one potential embodiment of the messaging server 150 illustrated in the system 100 of FIG. 1.

Persons of ordinary skill in the art will appreciate that elements in the figures are illustrated for simplicity and clarity so not all connections and options have been shown to avoid obscuring the inventive aspects. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

FIG. 1 illustrates one embodiment of system 100 that may be utilized accordance with one or more potential approaches to the present invention and its potential avenues for interaction with the real world toward implementing the concepts of the present invention. The system and associated methods perform the creation, management, selection and delivery of segments of digital music files. System 100 also facilitates communications between people 101a, 101b, 101c and 101d who may be senders, receivers, or both in the context of the system 100. People 101a, 101b, 101c and 101d may communicate via a variety of communication devices 102a, 102b, 102c, and 102d, respectively, via the cellular phone system 103 and/or the Internet 104.

Communication Devices 102

The present invention provides a system and method that can be utilized with a variety of different communication devices 102, including but not limited to PDAs, cellular phones, smart phones, laptops, tablet computers, and other mobile devices that include cellular voice and data service as well as preferable access to consumer downloadable applications. One such communication device could be an iPhone, Motorola RAZR or DROID; however, the present invention is preferably platform and device independent. In fact, ebook readers that provide web access (e.g. the Kindle (from Amazon.com) and the Nook (from Barnes & Noble)) may also be used as the communication device 102. The communication device technology platform may be Microsoft Windows Mobile, Microsoft Windows Phone 7, Palm OS, RIM Blackberry OS, Apple iOS, Android OS, Symbian, Java, Linux, or any other technology platform. For purposes of this disclosure, the present invention has been generally described in accordance with features and interfaces that are optimized for a smartphone utilizing a generalized platform, although one skilled in the art would understand that all such features and interfaces may also be used and adapted for any other platform and/or device.

The communication device 102 further includes a user interface that provides some means for the consumer to receive information as well as to input information or otherwise respond to the received information. As is presently understood (without intending to limit the present disclosure thereto) this user interface may include a microphone, an audio speaker, a haptic interface, a graphical display, and a keypad, keyboard, pointing device and/or touch screen. Thus, it is envisioned that the user interface may allow for inputting information or data via text, touch, or spoken word. The communication device 102 will also include a processor and memory. The memory may include ROM, RAM as well as one or more removable memory cards. The memory provides storage for computer readable instructions and other data, including a basic input/output system ("BIOS") and an operating system for controlling the operation of the communication device. The communication device will also include a device identification memory dedicated to identify the device, such as a SIM card, that uniquely identifies the device. Although the specification may focus on the communication device 102 being a smartphone, it should be understood by those of ordinary skill in the art having the present specification, drawings, and claims before them that this is simply for ease of explanation and not intended to limit the present invention to any smartphone embodiment.

One envisioned mode of delivery is via communication devices that do not contain any system-specific applications. In this delivery mode, the system will be received, managed and played using software indigenous to a stock mobile telephone, smartphone, tablet, or the like. In most instances, this approach would mean that the system would then be encoded as a standard-compliant multimedia messaging service (MMS) message. However, it is contemplated that native email programs available on many stock mobile telephones will be used in conjunction with the system. It is also contemplated that web-based email programs could be used. Further, it is contemplated that the message may be a one-to-one message, a one-to-many message, group message, or the like, as desired.

Even where the communication devices contain a system application, that application will necessarily rely on much of the device's indigenous software to handle the system. For instance, indigenous software will always be responsible for receiving the audio snippet from the server and for playing back the audio snippet through the mobile telephone's audio subsystem.

Furthermore, standards-compliant means in the mobile telephone will be used to encode and enforce the security policy associated with the system 100.

Cellular Telephone System 103 and Internet 104

The communication device 102 also preferably includes a mobile network interface to establish and manage wireless communications with the cellular telephone system 103. The cellular telephone system 103 uses one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCP/IP), general packet radio service (GPRS), WAP, ultra-wide band (UWB), IEEE 802.16 Worldwide Interoperability for Microwave Access (WiMax), SIP/RTP, or any of a variety of other wireless communication protocols to communicate with the mobile network of a mobile network operator. Accordingly, the mobile network interface may include as a transceiver, transceiving device, or network interface card (NIC).

To facilitate the use and bi-directional transmission of data between the server 140 and the communication devices 102, the cellular telephone system 103 is preferably operably connected to the Internet 104. In fact, Internet 104 may comprise the Internet, WAN, LAN, Wi-Fi, or other computer network (now known or invented in the future). It should be understood by those of ordinary skill in the art having the present specification, drawings, and claims before them that the communication devices 102 may be operably connected to the server over any combination of wired and wireless conduits, including copper, fiber optic, microwaves, and other forms of radio frequency, electrical and/or optical communication techniques. As will be discussed more fully herein below, many of the communications conducted via system 100 may be SMS (short message service), EMS (enhanced message service), MMS (multimedia message service), instant messaging, email messaging and other types of messaging that are or may become available for use in association with communication devices 102, and may include one-to-one messaging, a one-to-many messaging, group messaging, or the like, as desired.

Server 140, Messaging Server 150 and Databases 160, 170, 180 and 190

As shown in FIG. 1, server 140 comprises messaging server 150, SMS/EMS/MMS messaging system 155 (which can further include messaging capabilities of any known messaging or messenger system or software), music database 160, message database 170, asset management database 180, and analytic database 190. Although this illustration will serve to explain the aspects of the present invention well, as might be expected, there may be a substantial amount of overlap between subsystems and process elements, such that functionality may be moved between subsystems and process elements reorganized while still maintaining the spirit of the present invention. An administrator 105 may access the server 140 via computer 106 (which computer 106 may also comprise a communication device 102). As further illustrated in FIG. 1A, messaging server 150 includes the sender user interface 151, the audio extraction engine 152, the message generator 153, the recipient user interface 154, and analytic engine 185. As would be understood by those of ordinary skill in the art having the present specification, drawings, and claims before them, each of the sender user interface, the audio extraction engine, the message generator, the recipient user interface, and analytic engine may be implemented as software running on a variety of processor written in any of a variety of computer languages, however, these subsystems may also be fully or partially implemented in hardware or firmware using a variety of techniques that are well-known in the art. FIG. 1A also illustrates many of the significant connections between the databases 160, 170, 180 and 190 and the subsystems of the messaging server 150.

While the databases 160, 170, 180 and 190 are each depicted as a single database, it should be understood by those of ordinary skill in the art having the present specification, drawings, and claims before them that the any and all of the databases 160, 170, 180 and 190 may be stored in multiple locations and across multiple pieces of hardware, including but not limited to storage in the cloud (i.e. a set of virtual storage areas and systems that expand and contract with use without requiring the manual provisioning or deprovisioning of physical hardware by the administrator). In view of the sensitivity and/or commercial significance of most of the data stored in the databases they are preferably secured in an attempt to minimize the risk of undesired disclosure of viewer information to third parties. The databases may be standard relational database systems such as those available from Oracle, which are widely used to organize media files.

Figure 1B:
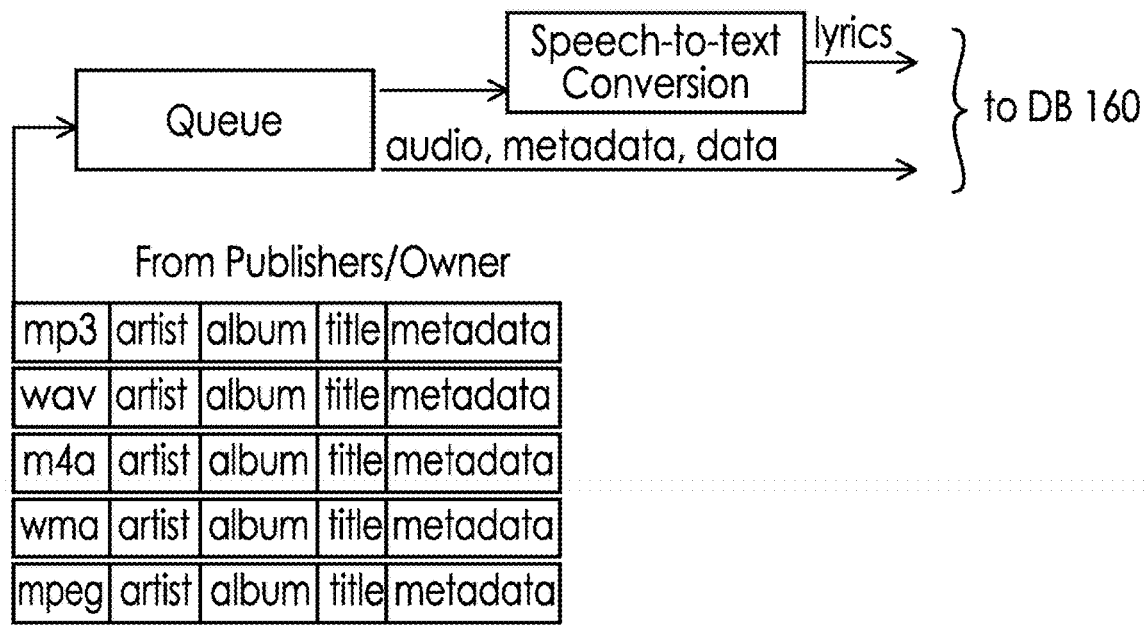
FIG. 1B illustrates one potential embodiment of a subsystem to ingest pre-existing recordings into the system 100.

As further illustrated in FIG. 1, music database 160 contains records 161$a$, 161$b$, . . . 161$n$ associated with a plurality of pre-existing recordings (or audio files). These records may be created by the subsystem/process illustrated in FIG. 1B to ingest pre-existing recordings into the system 100. In particular, one or more owners/publishers of pre-existing recordings (such as Rhapsody, Pandora, and iTunes) may send audio files in a variety of formats (including but not limited to mp3, way, m4a, wma, mpeg) along with artist, album, and title information, as well as metadata. Metadata is information about the media file and typically this information is particular to how the media database is to be used. For example, metadata for the iTunes recorded music database would include the name of a song and the name of the performer since this information is what Apple's customers wish to use to access the database. Indexing is the way metadata is processed to find a particular entry in the database. Additionally, it is understood that pre-existing recordings may come from any user who is using the application. In such exemplary embodiments, a user may upload original content from their device (such as videos, gifs, or audio in any desired file format). Further, this original content, in this or any other exemplary embodiment, may be uploaded in real time or may be uploaded at some time after the original content is created, as desired. This content may be tagged with appropriate metadata by the user for use throughout the system or shared with only desired parties for use, including the user alone. Further, it may be appreciated that any original content uploaded and tagged with metadata by a user may also have other metadata applied to it by the application so that it may be categorized and made searchable.

Because of the ability to provide publishers/owners of pre-existing recordings with income from even small portions of the recordings in their catalogs as well as the security provided for the pre-existing recordings, the system will leverage licensing deals with various catalogs of music to scan and index their libraries of pre-existing recordings dynamically. To optimize revenue for the publishers/owners, partners of the system will take each music catalog that is scanned and indexed and assigned a preferred purchasing method for the full track song in music records 161. Some catalogs may have current deals with iTunes or Amazon while others may allow for independent payment acceptance. However, the system is purchasing availability agnostic, meaning that the optimum route to purchase for a particular full track song is dynamically assigned at the time of indexing and can change as many times as the music catalog holder desires. The system will ingest any incentive data that is offered by the music label. Special offers, pre-purchase deals and more will be added to the master library and passed on to the users. Purchases that utilize an incentive offer will be easily tracked using the system reporting systems as well as the unique offer ID that accompanies each sale event at participating purchase partners (iTunes, Amazon etc.).

As shown in FIG. 1B, the pre-existing recordings are queued up and—to the extent the publisher/owner of the pre-existing recording does not provide the text of the associated lyrics—the pre-existing recording may be fed to a speech-to-text conversion engine (such as the commercial available speech-to-text engines sold by Nuance Communication), so as to create a lyric file from the pre-existing audio recording. The generated lyrics, audio file, data (e.g. artist, album, title), and metadata may be saved into music database 160 in a unique record 161. It is contemplated that the lyrics could be generated on-the-fly when a person indicates potential interested in a particular pre-existing recording so as to economize on the storage size of music database 160. However, the potential real-time performance problems (or conversely the need for expensive processor power) that could be created by dynamic lyric creation may make this approach less desirable.

As any audio files or snippet must be played back using hardware and software found in existing communications devices 102, the encoding of the audio clips should comply with existing standards and formats. It is contemplated that the audio clips may be stored in the music database 160 in a different format. For instance, pre-existing recordings within the music database 160 may preferably be the sampled versions instead of recordings of the full track versions. This not only reduces space but greatly enhances the secure nature of the relational databases. It being contemplated that full track versions for sale are maintained within the purchase partner systems. Where the pre-existing recordings are maintained in the database in a non-compliance format, the audio clip will be translated into the proper format when an audio clip is created for delivery. However, it is similarly contemplated that audio clips may be saved in one or more of a variety of formats because backend storage is cheap and response time of the system is critical.

FIG. 1 also illustrates that message database 170 contains records 171*a*, 171*b*, . . . 171*n* associated with the plurality of personalized messages that are created within the system 100 by a variety of people 101. As depicted, each record 171 may contain a unique identification for each personalized message created within the system, the identification of the sender of the personalized message, the electronic address of the intended recipient of the personalized message, the time the personalized message was sent by the sender, the personalized text associated with the personalized message, the desired lyric phrase, access to the desired audio clip, and metadata. Preferably the access to the desired audio clip will take the form of a handle to the location the desired audio clip (associated with the desired lyric phrase) is stored in association with server 140 (not shown). It is possible—although less preferred due to the rights management issues it may cause—for access to the desired audio clip to take the form of the desired audio clip, itself.

Database 180 contains data related to asset management, which may include, among other data, sender account information. The sender account information will include at least an electronic address for each sender associated with the system 100. The electronic address may comprise an email address, an SMS short code, an SMS long code, or other means of reference one or more communication devices 102 (e.g. telephone number, ESN, IMEI and/or MEID) associated with a sender. Database 180 may also contain data related to sponsorship of the system 100. For example, a company may wish to ingratiate itself to customers or potential customers by subsidizing the use of the pre-existing recordings. In such a case, the sponsoring company may store its logo and other marketing material for use in association with the personalized messages it is financing. A sponsor funds account would also be established in database 180 so that funds may be deducted from the account by the analytic engine 185 upon the occurrence of a predetermined event, such as i. a sponsored user sending an electronic message to the electronic address of a recipient;
    ii. the recipient successfully receiving the electronic message; or
    iii. accessing the handle of the desired audio clip in the personalized message.

It is contemplated that some senders will not want to be exposed to marketing materials of sponsors and some senders will not be interesting to certain sponsors. In either such instance, the system 100 would provide the facility for the sender to fund their own account. By providing a flag (or other mechanism for differentiating between sponsored and unsponsored senders), the system 100 can track which senders are exposed to the marketing materials of one or more sponsors and thus debit all costs associated with creating and sending personalized message from the one or more sponsors.

The analytic engine 185 (FIG. 1A) monitors events generated by at least one of sender user interface 151, audio extraction engine 152, message generator 153, and recipient user interface 154. A wide variety of behavior is tracked including when a personalized message was created, what type of messaging format the creator and recipient were using, how often that personalized message was viewed by those other than the original recipient (vitality measure), what licensee requested the message, the dollar amount in full track purchases that a specific messages generated and any incentives that were applied.

The administrator manages the sender account databases and authentication methods removing the burden of maintaining personal consumer information from publishers and owners.

Among other potential data gathered by the analytic engine would also be the occurrence of predetermined events that result in charges to the account. By tracking one or more of the types of predetermined events discussed above the analytic engine 185 will be able to gather data for storage in analytic database 190. The data in analytic database 190 may be mined for a variety of purposes. These purposes may be expanded by requesting demographic data from each sender upon the establishment of the sender account within system 100 and potentially from each recipient as well. Furthermore, the collection of the demographic data may provide the user with suggested snippets to send or targeted marketing based specifically on the unique set of demographic and environmental or technical information of the user and the recipient at any given point in time. For example, a sender's and recipient's location (zip code or geo-location) may be used to create a playlist that includes potentially preferred pre-existing recordings (e.g. country music for senders or recipients located in Texas).

The system 100 may also include digital rights management (DRM) for anti-piracy (e.g. digital watermarking and audio fingerprinting technologies); playlist generation; and audio thumbnail and albumming technologies. Although in most cases a digital right management strategy will not be necessary the ability to embed a particular DRM at the request of a label may be possible within the system. It is believed that DRM will not be necessary due to (1) the extremely short snippets of song that are created by the system (expected generally to be under 19 seconds in length); (2) the preferred approach to the system and methods of distributing only a handle (or link) to the song clip which is housed in a secure manner at the server and then streaming the audio upon actuation of the clip (rather than downloading the file); and (3) the ability of the system to monetize each playback of the linked song snippet for the publisher/owner and/or limit the number of times the pre-existing recording may be played via the system.

The Process

Figure 2A:
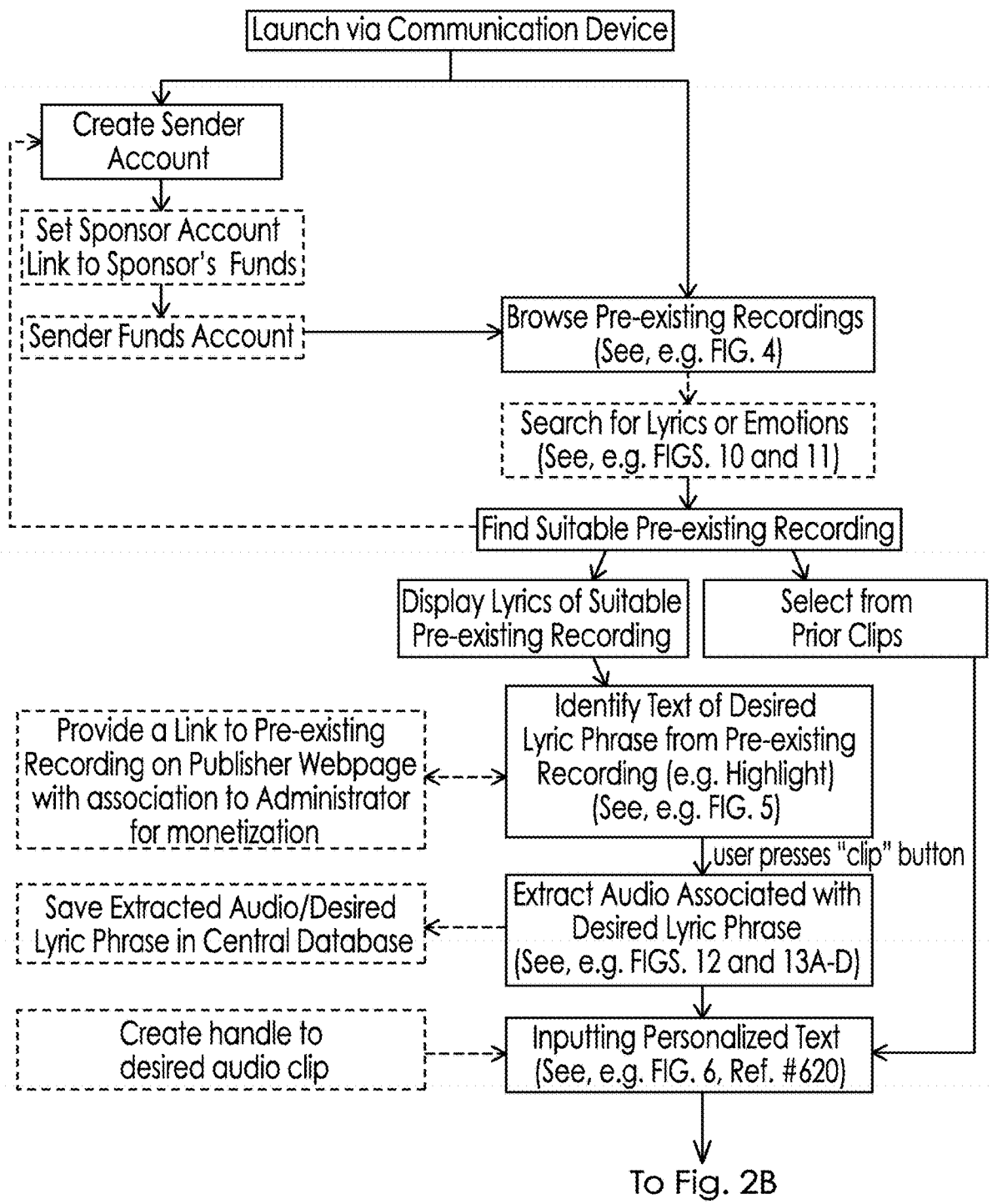
FIGS. 2A and 2B together illustrate the flow of one embodiment of the processes that may be associated with one or more potential approaches to the present invention.
Figure 2B:
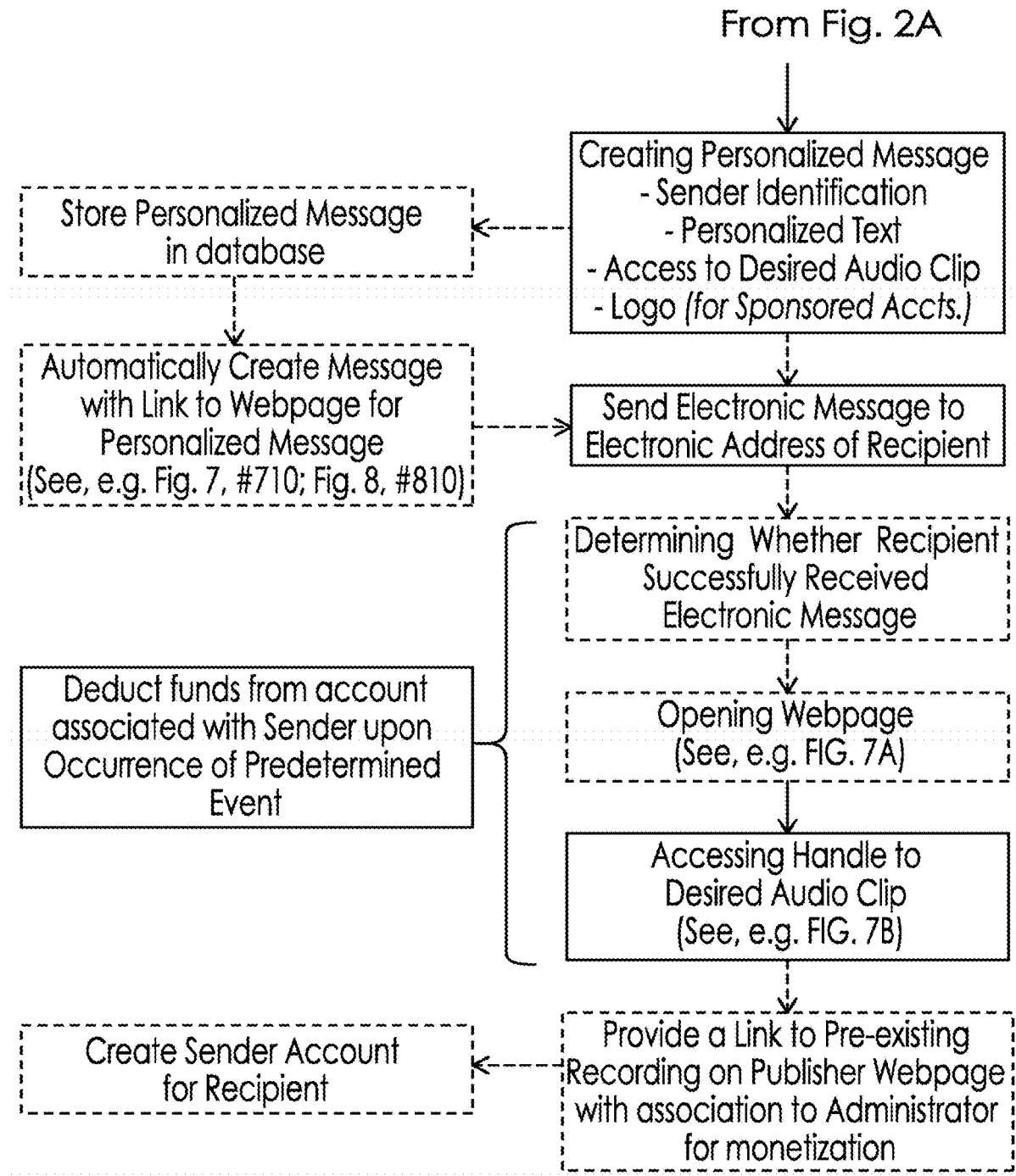

FIGS. 2A and 2B together illustrate the flow of one embodiment of the processes that may be associated with one or more potential approaches to the present invention. Certain of the elements of the process illustrated in FIGS. 2A and 2B have been further illustrated by the screen shots illustrated in FIGS. 3-11. In particular, these screen shots collectively illustrate one potential flow of various aspects of the inventive system and method on one particular type of smartphone. In particular, these screen shots are depicted on a smartphone that includes a touch sensitive screen, such that activation of any depicted button merely requires the touch of a finger or stylus within the real-estate encompassed by that button. Further, although the present application illustrates the invention in times of buttons and touch, it should be understood by those in the art having the present specification and claims before them that the commands used in the system may be spoken (i.e. voice commands) using an interface such as Ski (Apple Computer, Cupertino, Calif.). As should be understood by those of ordinary skill in the art the particular look and feel, text, the ordering of the information used to illustrate this particular embodiment may not be necessary to implement the inventive concepts disclosed herein.

Turning to FIG. 2A, the process begins when a sender launches the application via a communication device 102. The application may be web-based, pre-loaded or otherwise downloaded onto the communication device 102 as a thin (or even thick) client providing a conduit to the sender user interface 151 associated with messaging server 150 or it may be more robust providing more the user interface functionality locally in conjunction with sender user interface 151. Additionally, it may be appreciated that the application may be found in a messenger tray associated with commonly used messaging or messenger systems and software. In such exemplary embodiments, upon the launch of the messaging system or the like, an icon for the application may automatically be displayed in a corresponding messenger tray, which, upon selection, may launch the application, as desired. The application may be an application programming interface (API) that associates the functionality discussed herein with another program, such as an email program, on-phone messaging applications, interactive video game platforms, browser plug-ins and more.

Figure 3:
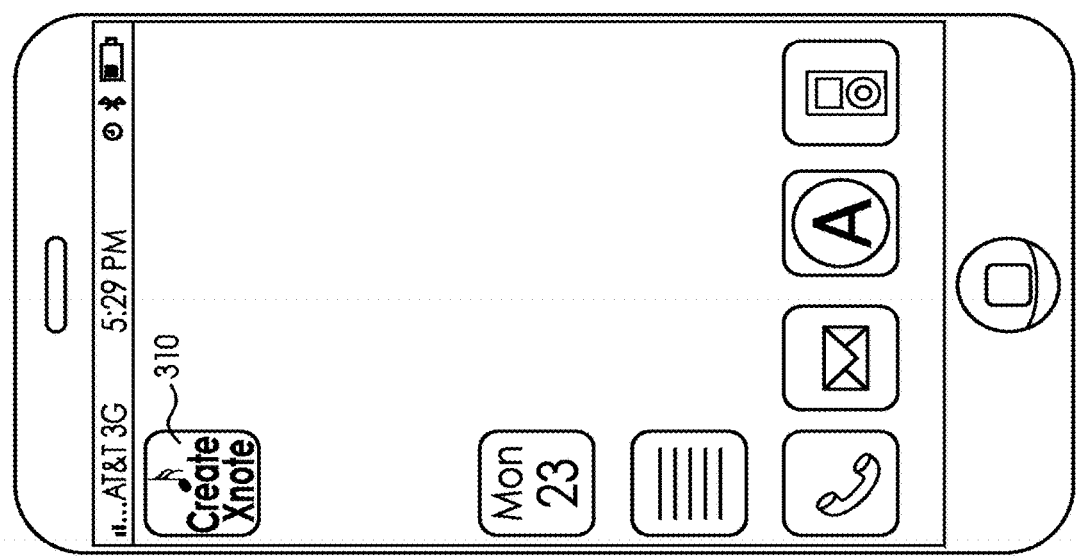
FIG. 3 illustrates one potential aspect of the deployment of the system 100 on one particularly illustrative smartphone-based user interface depicting, in particular, a launch icon (among other icons) to start the messaging process.

FIG. 3 depicts a launch icon 310 (among other icons) to start the process. The first time using the process, a sender 101a will need to create a sender account, although (as illustrated in FIG. 2A) it is possible for the sender to browse, search and find a suitable pre-existing recording before creating the account. The flow of account creation is well understood and thus not illustrated in the drawings. The data that is desired for storage in asset management database 180 (and use with analytical database 190) will be gathered in this process along with an indication of whether the sender is a sponsored sender or an unsponsored sender. Unsponsored senders will need to also establish funds (which may also be in the form of credits that may be earned or paid for) for use in paying for the audio snippets/desired audio clips that the sender will wish to include in their personalized messages.

The sender may browse pre-existing recordings looking for a lyric phrase that helps the sender express their current mood or emotions about the intended recipient of the personalized message or the subject contemplated for the personalized message. For instance, the sender 101a may be excited about a party they will be attending with the intended recipient of the personalized message so they have decided to write the recipient a personalized message to get them excited about the forthcoming events, too. In another example (illustrated in association with FIGS. 4-6), the sender 101a may be worried about the intended recipient so they have decided to write the recipient a personalized message to convey that the recipient can always count on them to support and/or cheer them up. In particular, in FIG. 4, the sender is browsing through pre-existing recordings 401a, 401b, 401c, 401d, and 401e available in music database 160 that have been sorted in alphabetical order by the artists' last names. As would be understood by pressing the "Next" link illustrated near the bottom of the touch screen of communication device 102, another screen of pre-existing recordings 401 through 401n would be displayed on the screen. (FIG. 4A depicts a slightly different embodiment, where the sender is a sponsored sender and the music browsing screen features the logo and/or branding of the sponsor 450, in the illustrated example this has taken the form of the "Cola Co" logo.) It should be understood that the location, size, and frequencies at which the logo and/or branding of the sponsor 450 may change depending upon the sponsor, user behavior/demographics, and the sender's use of the system.

As illustrated, browsing mode may provide the sender with album cover art work in addition to the title, artist and album associated with each pre-existing recording. In the embodiment illustrated in FIG. 4, by pressing the play button 402a, 402b, 402c, 402d, or 402e associated with any particular entry 401a, 401b, 401c, 401d, and 401e, respectively, causes the pre-existing recording to play. In the embodiment illustrated in FIG. 4, by pressing the message button 405a, 405b, 405c, 405d, or 405e associated with any particular entry 401a, 401b, 401c, 401d, and 401e, respectively, causes the screen illustrated in FIG. 5 showing the lyrics 510 associated with the pre-existing recording 401 is launched. These lyrics 510 will be downloaded from the music database 160 through sender user interface 151 preferably via Internet 104 to the communication device 102. As illustrated in FIG. 2A, the sender may be provided with the alternative of selecting from among audio clips that were previously created from the pre-existing recording 401, instead of having to select from the lyrics. These prior clips may be ranked based on their volume of prior usage and/or may be personalized based on the sender's prior interaction with the system. If a prior clip is selected, a new means for accessing the desired audio clip must be created for the message, which may take the form of a new handle created to the desired audio clip or the creation of a new instance of the audio clip for insertion into the message depending upon the approach implemented.

Figure 4:
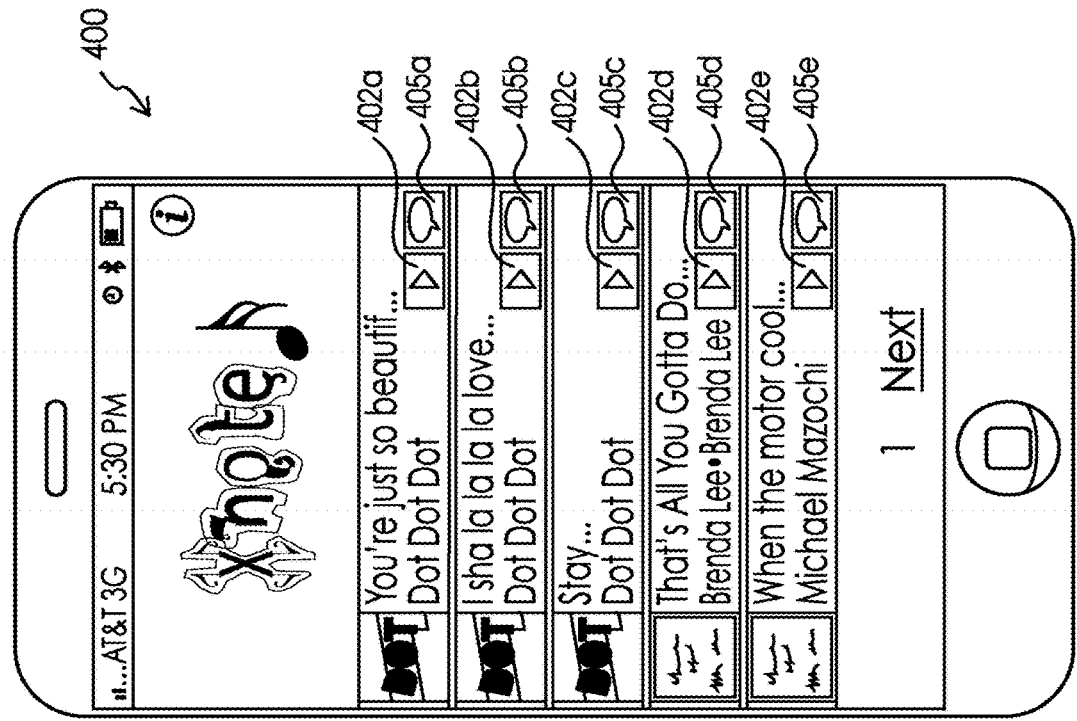
FIG. 4 illustrates one potential aspect of the deployment of the system 100 on one particularly illustrative smartphone-based user interface depicting, in particular, a user interface for browsing pre-existing recordings.
Figure 4A:
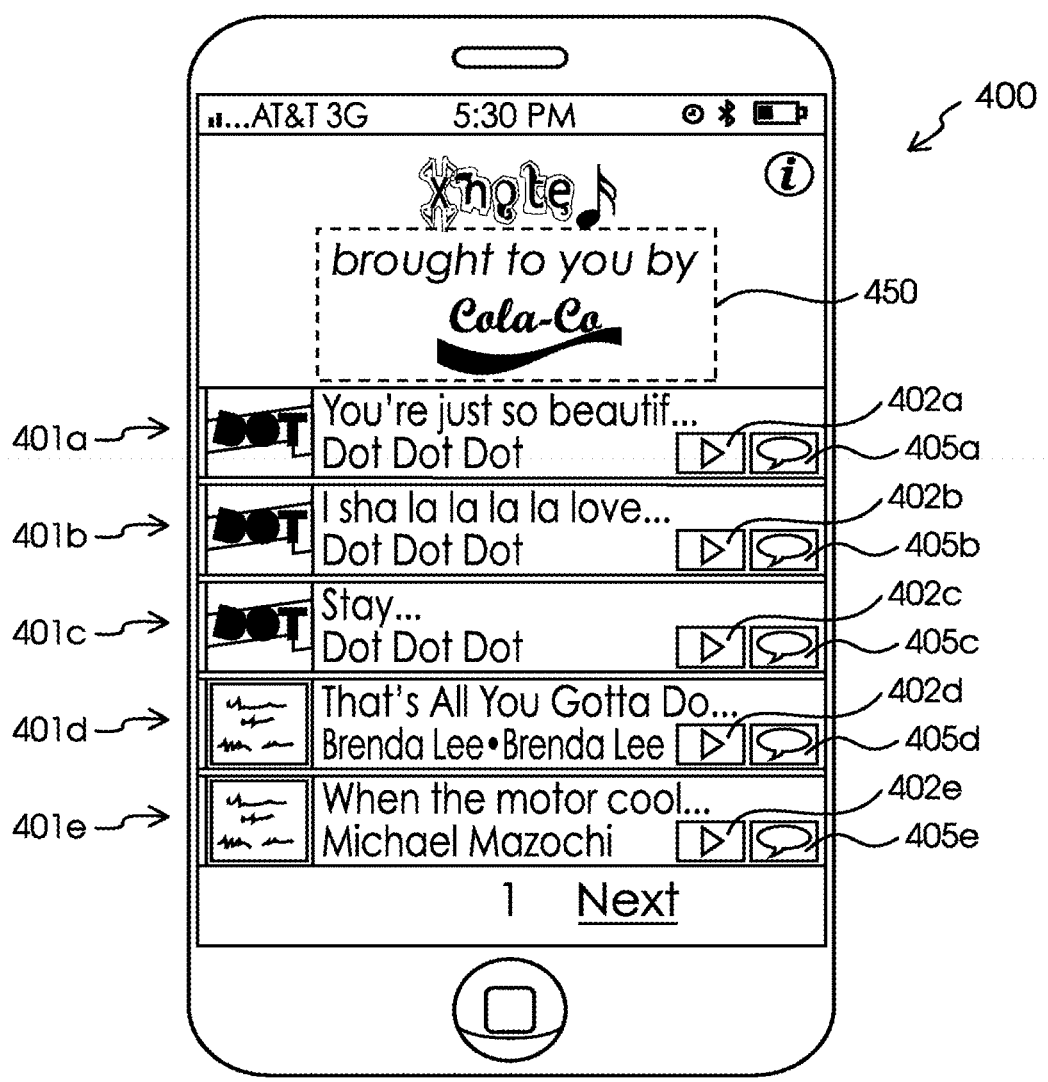
FIG. 4A illustrates one potential aspect of the deployment of the system 100 on one particularly illustrative smartphone-based user interface depicting, in particular, a user interface for browsing pre-existing recordings where the sender's use of the system has been sponsored by a company (referred to as the "Cola Co" (with associated logo) in the example illustrated).

FIG. 5 depicts the next step when the sender decides to display the lyrics of the suitable pre-existing recording toward selecting their own desired lyric phrase (by pressing message button 405d (see FIG. 4). FIG. 5 also depicts one potential user interface mechanism for identifying the text associated with the desired lyric phrase from a pre-existing recording. By quickly dragging the user's finger in a downward (or upward) motion on the touch screen additional lyrics 510 may be scrolled onto the screen. When the sender sees the lyrics they were looking for, by pressing and dragging their finger across the touch screen of the illustrated smartphone, a selection box may be formed around a portion of the lyrics 505. As is known by end users of such smartphones, the size and position of the box can be changed by placing their finger at a different location on the touch screen and dragging it along the screen until the selection box encompasses the desired lyric phrase 510 from the pre-existing recording 401*d*. As would be understood by those of skill in the art other user interfaces for scrolling and selecting text on a screen such as cursor manipulation with a mouse, touchpad, track wheel or other pointing device would work in a similar manner to that discussed above. It is possible, that the sender won't find the lyrics they were hoping to find within a particular pre-existing recording, in which case by selecting the back arrow 515, they would be returned to the portion of the user interface depicted in FIG. 4. The user interface of FIG. 5 also provides a link 525 to the entire pre-existing recording directly from the publisher (in the illustrated example iTunes) webpage associated with recording to provide the sender an easy opportunity to purchase the whole pre-existing recording. The link 525 would have an association to the administrator of the system 100 so that it can monetize the sender's acquisition of the pre-existing recording. In other words, if the sender buys a song from iTunes because they saw it on the system 100, iTunes may compensate the owner of the system for the referral. Various types of mechanisms for crediting referring sites for "click-throughs" such as cookies are well-known to those of ordinary skill in the art.

Figure 12:
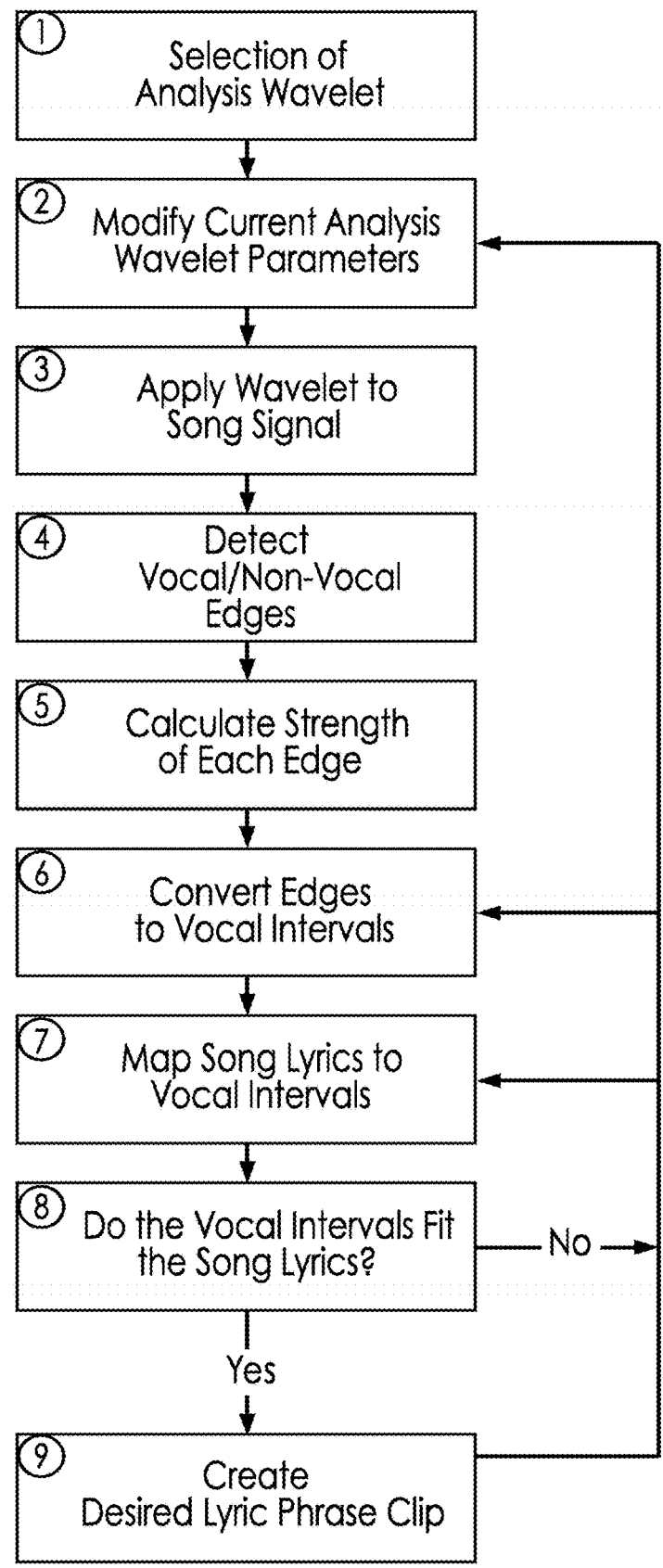
FIG. 12 illustrates the flow of one potential embodiment of the process that extracts the audio substantially associated with a desired lyric phrase from a selected pre-existing recording into a desired audio clip.

If the desired lyric phrase 510 has been selected from the lyrics 510 of the pre-existing recording, the "Next" button 520 (near the top right of FIG. 5) would be selected in the illustrated interface, which would prompt the extraction of the audio clip substantially associated with the desired lyric phrase to begin via a substantially automated process that will be discussed in association with FIGS. 12 and 13 later in the application. It is contemplated that the extracted audio clip and associated desired lyric phrase may be saved in central database, such as database 160 or 180 to minimize the need to perform extractions (which may be processor intensive) particularly where the desired lyric phrase has been or is expected to be popular. In such instances where the extracted audio has been saved, this corresponds with the concept of having extracted the audio associated with a desired lyric phrase. In a preferred embodiment of the process, a handle is created that points to the storage location of the desired audio clip, such that the handle can be included in the personalized message rather than actually embedding the desired audio clip. This is desirable for a few reasons including, but not limited to, safer rights management and minimizing the size of personalized messages, which may be stored and/or transmitted.

Returning to FIG. 2A, after selecting the desired lyric phrase, the sender creates the rest of the personalized message. One illustrative interface for this task is shown in FIG. 6. In no particular order, the sender identification 605 may be input manually, spoken into a microphone, or automatically populated by the sender user interface 151; the electronic address of the recipient 615 is input; and a personalized text is input into text field 620 or spoken into a microphone to populate a text field. It may be appreciated that in some exemplary embodiments where commands and inputs are spoken into a microphone that the text or input information may not be visible, for example visible in field 620. However, in such exemplary embodiments, the spoken commands or inputs may be utilized to appropriate populate input data and used to promote execution of commands or further actions. The recipient address may be retrieved from a local address book on the communication device 102 by selecting button 616 and operating the address book in a well-known manner. The sender may input personalized text into text field 620 using an onscreen keyboard (which has not been depicted in FIG. 6) so as not to obscure the option of displaying the desired lyric phrase 510 in a convenient location to the text field 620 so the sender may coordinate the personalized text with the desired lyric phrase 510. As depicted in FIG. 6, the interface may provide the sender with the number of characters remaining within the message format 625. It is contemplated that the personalized text may have no characters. Alternatively, in exemplary embodiments where commands and inputs are spoken into a microphone, it may be appreciated that the text, for example, may be automatically populated into a field, such as when using a voice to text feature on a smart phone. In other exemplary embodiments, for example when using a smart speaker (such as the Amazon Echo®) or other voice-controlled technology, input information may be populated into a virtual field that is stored on the smart speaker device or system for further execution. Additionally, instead of displayed buttons or visual searching, a user may be prompted by audio cues to select information, execute a command, or search a database (such as searching for a recipient address).

Rather than send a text-based message, after selecting the desired lyric phrase, the sender could create an audio message that may be delivered by playing back a recording that is comprised of both the extracted audio, but also audio recorded by sender for inclusion as a personal message. In such an embodiment, the sender would input the electronic address of the recipient 615 as a telephone number and then speak a personalized text, which may be converted to text by a speech-to-text engine. It would be similarly possible for the user to type the desired text of the personalized message for it to be converted to audio via a text-to-speech program. In any approach, the extracted audio and the personalized audio are recorded together and then distributed.

Figure 8:
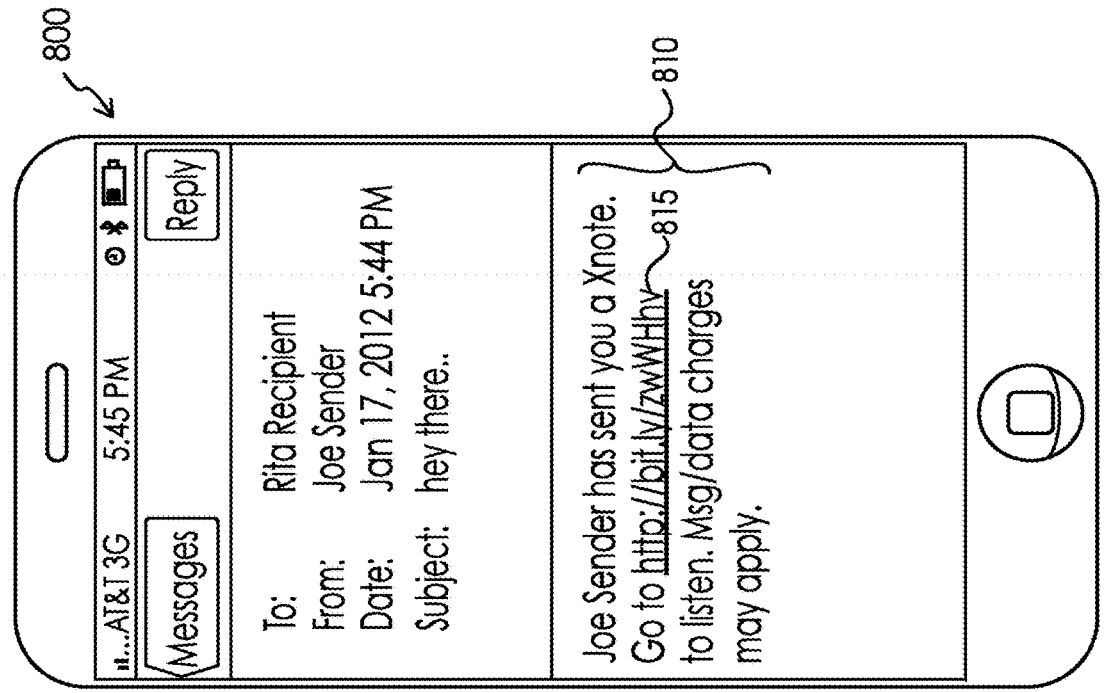
FIG. 8 illustrates the receipt by the recipient on an illustrative communication device (i.e. smartphone) of an electronic message including a link to the personalized message created by the sender as automatically created and sent by system 100 in the form of an email message.
Figure 9:
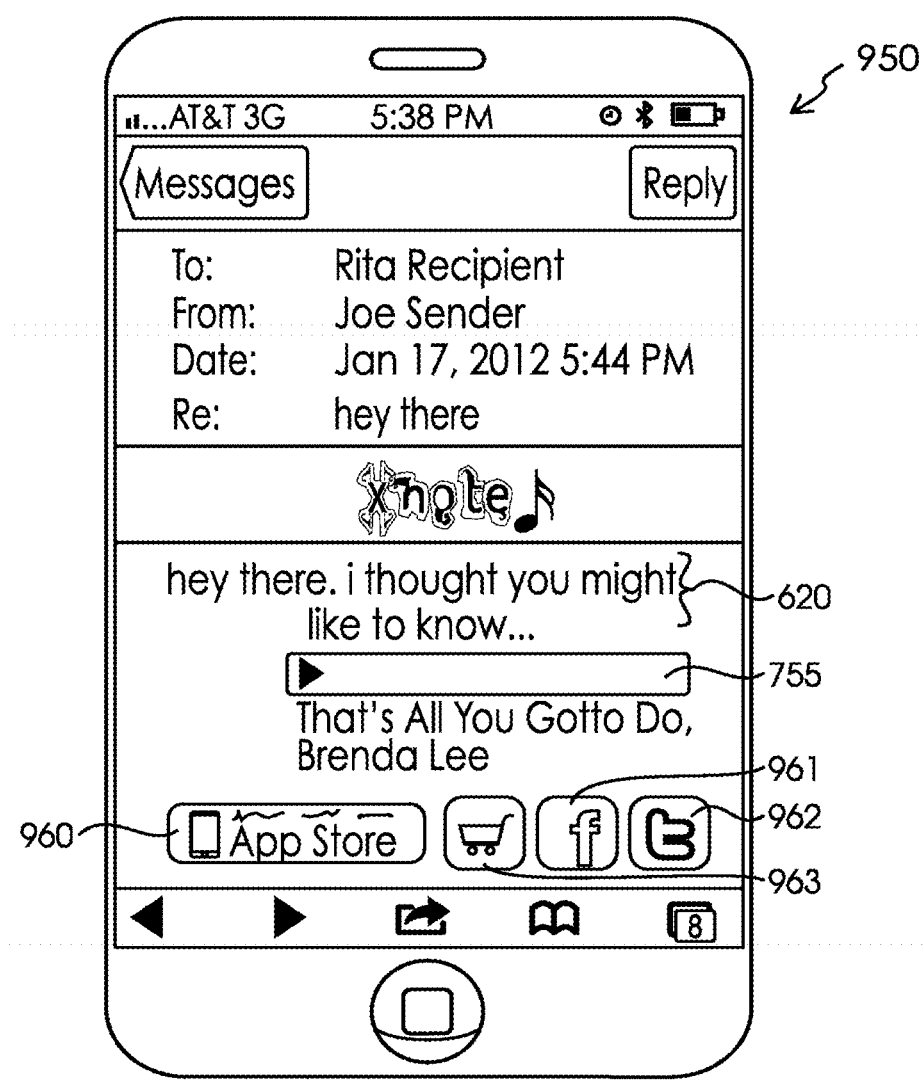
FIG. 9 illustrates the receipt by the recipient on an illustrative communication device (i.e. smartphone) of an electronic message automatically created and sent by system 100 in the form of an email message comprised of the personalized message created by the sender.

Turning to FIG. 2B, message generator 153 within messaging server 150 creates the personalized message including sender identification, the personalized text, access to the desired audio clip, and where the sender is a sponsored sender, the logo or other marketing materials that the sponsor wanted included with the personalized message. It should be understood that any particular sponsor may choose not to include any logo or other marketing materials in the personalized message, but rather rely upon sponsorship branding in other aspects of the user interface such as the audio browsing screens, as illustrated above in association with FIG. 4A. The message generator 153 then generates and sends an electronic message to the electronic address of the recipient via either SMS/EMS/MMS messaging system 155 and cellular phone system 103 or Internet 104 depending on the type of electronic address provided by sender 101a. The electronic message may be an SMS/EMS/MMS message, instant message or email message including a link to the personalized message or an EMS/MMS or email message including the personalized message for one or many recipients. FIGS. 7, 8 and 9 best illustrate many of the differences between these potential types of electronic message. FIG. 7 illustrates the receipt by the recipient on a smartphone of an electronic message that includes a link 715 to the personalized message created by the sender. In this exemplary illustration of FIG. 7, the text 710 with embedded link 715 are automatically created and sent by the server 140 in the form of a text (e.g. SMS/EMS/MMS) message. However, it may be appreciated that the personalized message created by the sender may also show up in the form of video or audio file, as otherwise contemplated herein. Further, in some exemplary embodiments, the video or audio file sent and displayed as the personalized message created by the sender may include an embedded link, such as link 715. In this exemplary embodiment, link 715 may provide the recipient with access to full audio or video content associated with the personalized message, such as a link to a full music video, movie, or other audio and/or video content found on the internet or in or associated with a software application. The full music video, movie, or other audio and/or video content may further be the original content from which the plurality of audio and visual files were created. FIG. 8 illustrates the receipt by the recipient on a smartphone of an electronic message including a link 815 to the personalized message created by the sender. In this exemplary illustration of FIG. 8, the text 810 with embedded link 815 were automatically created and sent by server 140 in the form of an email message. Finally, FIG. 9 illustrates the receipt by the recipient on a smartphone of an electronic message automatically created and sent by server 140 in the form of an email message comprised of the actual personalized message created by the sender.

Returning to FIG. 7, when the recipient clicks on link 715, in the manner controlled by the operating system associated with the communication device 102 a browser is launched and directed to open the webpage at the address of the link. The result of that process on the recipient's communication device 102 in the illustrative example is depicted in FIG. 7A. By pressing the play button in audio bar 755, the recipient accesses the desired audio clip included by the sender in the personalized message and the audio begins to play via the speaker associated with communication device 102. While the default is for the audio clip to be displayed after the personalized text, the audio bar 755 may be positioned by the sender anywhere in the text when creating the message.

In the most preferred embodiment, the desired audio clip has been maintained by the centralized host (e.g. server 140) such that clicking on the play button causes the contents of the file to be streamed to the recipient's communication device 102 in substantially real time and played via the audio system of that communication device 102.

Figure 7B:
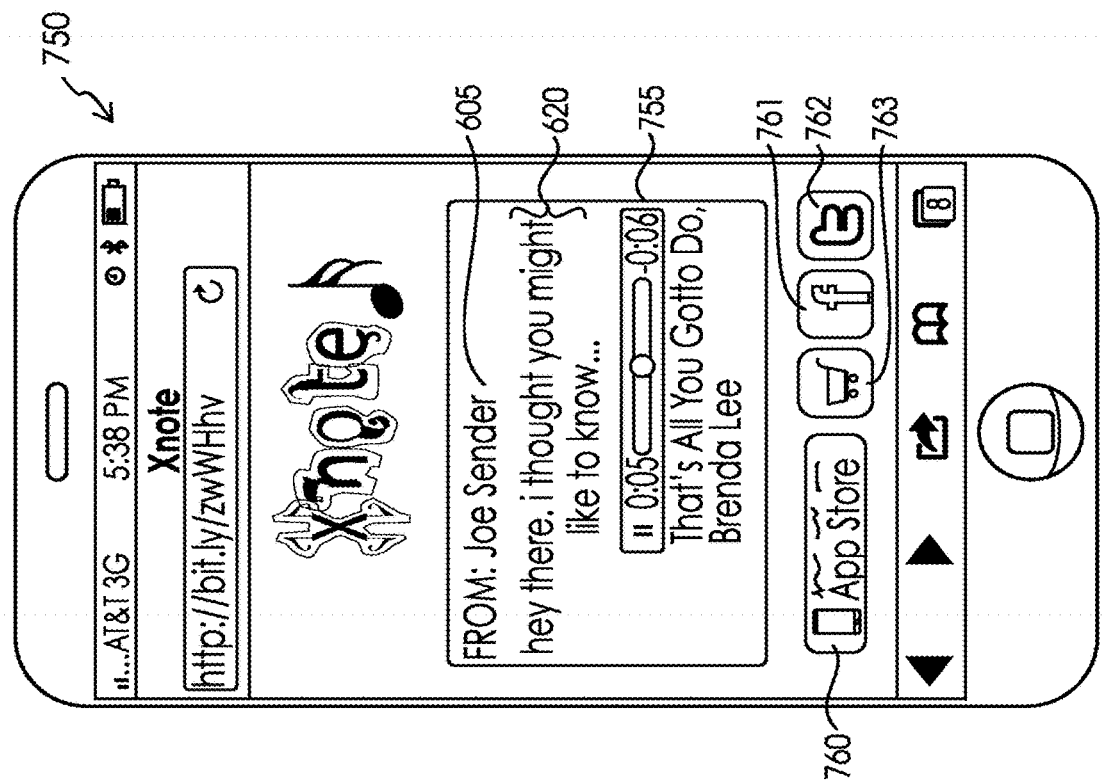
FIG. 7B illustrates the state of the recipient's illustrative communication device (i.e. smartphone) after clicking on the link in the electronic message automatically created and sent by system 100 in the form of a text (e.g. SMS/EMS/MMS) message as illustrated in FIG. 7, depicting the playback of the desired audio clip from within the personalized message created by the sender as generated in association with the recipient user interface of messaging server 150 of FIG. 1.

As illustrated in FIG. 7B, a progress indicator in audio bar 755 may show timing information associated with the current playback of the audio snippet. A pause button is also illustrated and would have the functionality widely understood by end users. As further depicted in FIGS. 7A and 7B, the recipient is provided with a button 760 that would download the client portion of the application onto their communication device allowing them to create a sender account and send personalized messages via the system 100. Other buttons may also be provided so the recipient can share a description of the personalized message on a first social network (such as Facebook®) (button 761) or on a second social network (such as by Tweeting) about the personalized message (via button 762). In both instance, the system may also allow the personalized text and textual information associated with the desired audio clip to be posted on either or both of first and second social networks.

Every personalized message is tracked and recorded in the analytics database along with several parameters such as the licensee that initiated creation, device type of each play etc. The personalized messages may be designed to be circulated and replayed via channels like social networks. While the ability of the personalized messages to travel through various networks to be experienced by many is valuable, the present system is mainly focused on the ability to provide a new form of peer-to-peer communication that provides a marketing opportunity for sponsors.

It is also contemplated where the sender wants privacy for the message, the buttons may be disabled by selecting options before sending the personalized message. The final button that may be provided by the recipient user interface 154 is a shopping cart button 763, which would take the recipient to a webpage hosted by the publisher (such as Rhapsody, Pandora, or iTunes) associated with complete recording from which the audio snippet was taken to provide the recipient an easy opportunity to purchase the whole pre-existing recording. The button 763 would have an association to the administrator of the system 100 so that the administrator can monetize the recipient's acquisition of the pre-existing recording. In other words, if the recipient buys a song from iTunes because they received it in a personalized message created by the system 100, iTunes may compensate the owner of the system for the referral. Various types of mechanisms for crediting referring sites for "click-throughs" (such as cookies) are well-known to those of ordinary skill in the art.

Figure 8A:
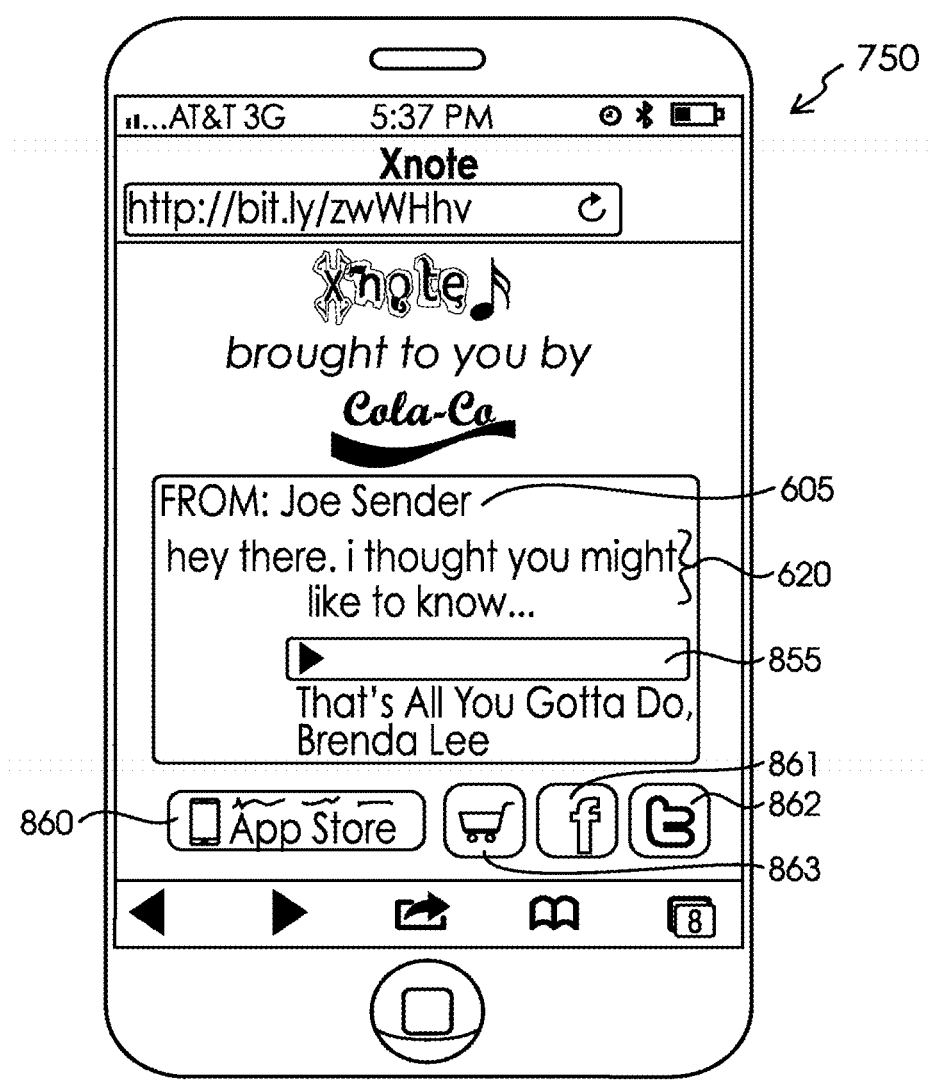
FIG. 8A illustrates the state of the recipient's illustrative communication device (i.e. smartphone) after clicking on the link in the electronic message automatically created and sent by system 100 in the form of an email message as illustrated in FIG. 8, depicting the personalized message created by the sender as generated in association with the recipient user interface of messaging server 150 of FIG. 1 where the sender's use of the system has been sponsored by a company (referred to as the "Cola Co" (with associated logo) in the example illustrated).

Returning to FIG. 8, when the recipient clicks on link 815, in the manner controlled by the operating system associated with the communication device 102 a browser is launched and directed to open the webpage at the address of the link. The result of that process on the recipient's communication device 102 in the illustrative example is depicted in FIG. 8A in an example where the sender is a sponsored sender. Consequently, while the result of selecting link 815 in FIG. 8 and link 715 in FIG. 7 are practically identical, FIG. 8A additionally illustrates one potential approach to sponsorship branding of the system. As with the exemplary interface illustrated in FIG. 7A, by pressing the play button in audio bar 855 in FIG. 8A, the recipient accesses the desired audio clip that was selected by the sender for inclusion in the personalized message and the audio begins to play via the speaker associated with communication device 102. As further depicted in FIG. 8A, the recipient is provided with a button 860 to download the client portion of the application onto their communication device. First social network button 861, second social network button 862 and shopping button 863 have the same functionality as that disclosed in association with buttons 760, 761, 762, and 763 in FIGS. 7A and 7B.

Returning to FIG. 9, the email message 950 depicted incorporates the personalized message that the text and email embodiments of FIGS. 7 and 8 required the intermediate step of launch a browser and opening a webpage. Here the functionality provided on the webpages of FIGS. 7A and 8A is included directly in the body of the email message 950. As should be understood, the recipient is provided with a button 960 to download the client portion of the application onto their communication device. First social network button 961, second social network button 962 and shopping button 963 have the same functionality as that disclosed in association with buttons 760, 761, 762, and 763 in FIGS. 7A and 7B. It is also contemplated that if a sponsored sender created the personalized message in a situation where the sponsor wanted created in the received email message 950 for having supported the communication, the email message would include the sponsor marketing materials, too (as illustrated in the embodiment of FIG. 8A).

Figure 11:
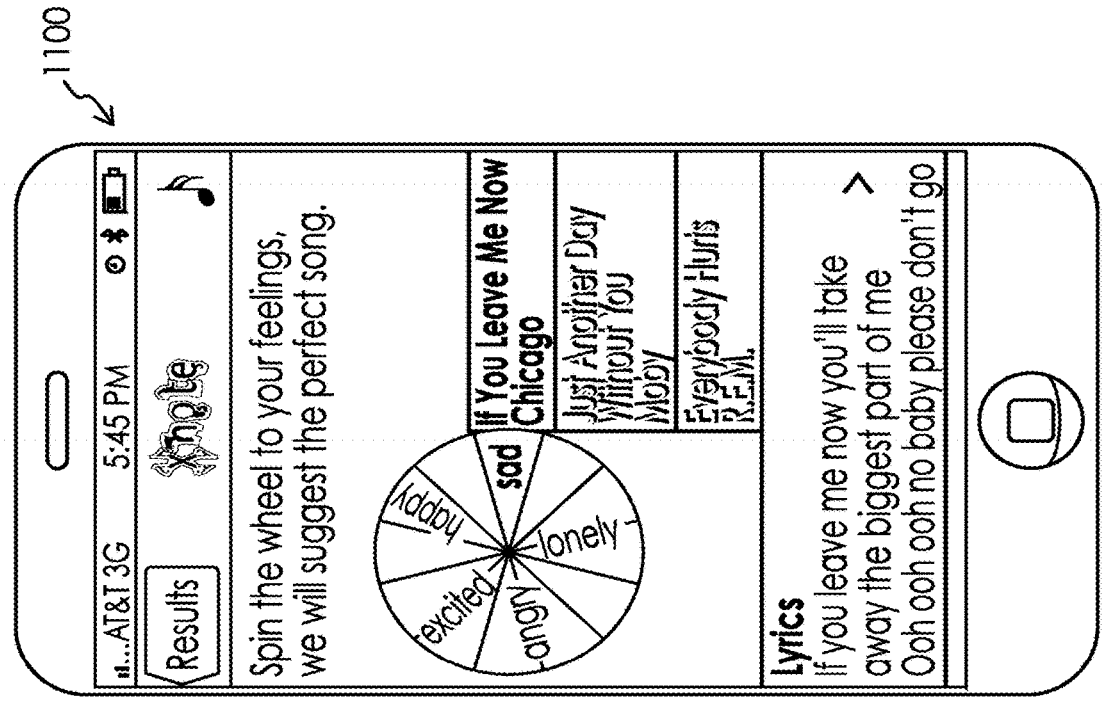
FIG. 11 illustrates one potential aspect of the deployment of the system 100 on one particularly illustrative smartphone-based user interface depicting, in particular, a user interface for searching for one or more pre-existing recordings available through system 100 associated with a desired emotion from a list of possible emotions.
Figure 10:
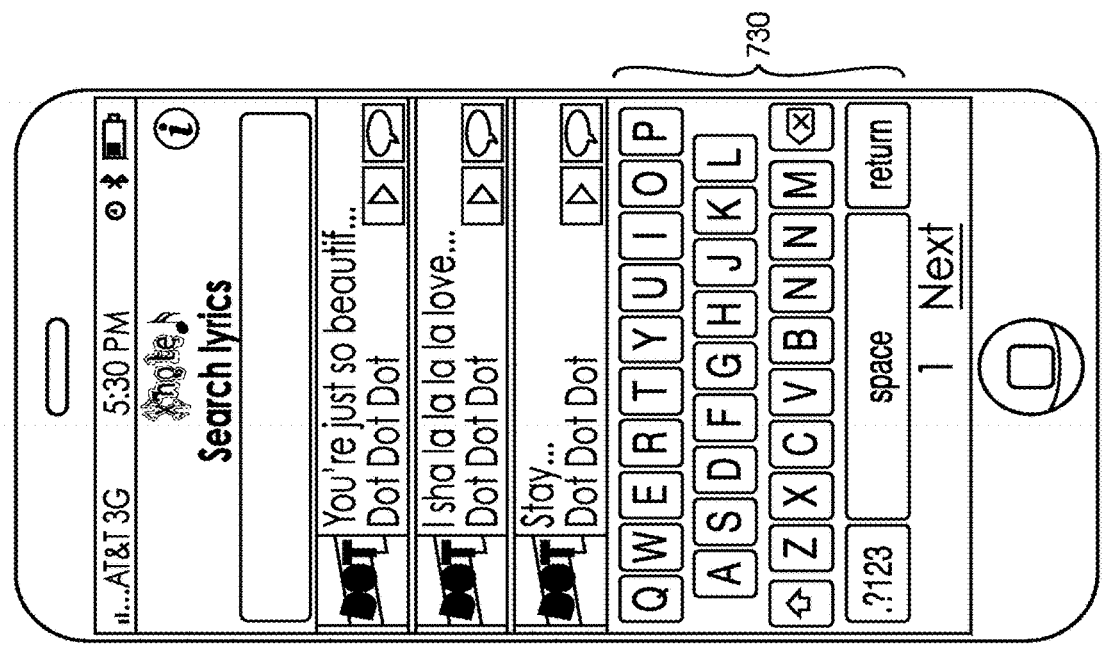
FIG. 10 illustrates one potential aspect of the deployment of the system 100 on one particularly illustrative smartphone-based user interface depicting, in particular, a user interface for text searching for a desired lyric phrase within the one or more pre-existing recordings available through system 100.

FIG. 10 illustrates a user interface for text searching for a desired lyric phrase within the one or more pre-existing recordings available through system 100. In particular, by using a keyboard such as on-screen keyboard 730, or voice commands, controls, and prompts, the sender could input a lyric like "call me" or "can't wait to see you" and then the sender user interface 151 will winnow down the potential pre-existing recordings to those that contain the exact lyrics (or in some embodiment fuzzy alternatives to the searched terms). FIG. 11 illustrates another potential user interface for searching for one or more pre-existing recordings available through system 100 associated with a desired emotion from a list of possible emotions. As illustrated, a list of emotions, such as angry, excited, happy, sad, lonely, etc. may be included on a wheel that rotates past a selector arrow. After the emotion is selected a list of song is compiled and displayed. As illustrated in FIG. 11, if the emotion "sad" is selected the song "If You Leave Me Now" by Chicago and two other songs are listed. The sender can select one of those songs, which would open an interface similar if not identical to that of FIG. 5 so that the sender can identify text of the desired lyric phrase from within the song. FIG. 11 also depicts the possibility of providing a lyric preview window to help the sender in the selection of songs to review for a desired lyric phrase.

If the music database 160 used within the system is to be small and slowly growing—for example 100's of clips with 10 new clips being added every day—then it is technically and economically practical that each clip be hand-crafted. If, on the other hand, the music database 160 is to be large and rapidly growing—for example 10,000's of clips with 1,000 new clips being added every day—then some automatic or semi-automatic method of creating clips must be defined. This is particularly the case if it is expected to be able to handle on-request and in real-time the creation of a system that isn't already in the catalog. The audio extraction engine 152 can automate this operation or provide a database of categorized, extracted audio and visual snippets that may be selected in the application.

Returning now to FIG. 1A, the audio extraction engine 152 is operably associated with the music database 160 and the sender user interface 151 to extract audio substantially associated with the desired lyric phrase 510 (see FIG. 5) found within one of the plurality of pre-existing recordings 401 $d$ (see FIG. 4) into a desired audio clip. The music database provides two inputs into the audio extraction engine: the pre-existing digital recording (which may be in any one of a variety of digital formats such as MP3, WAV, MPEG-4) containing the desired lyric phrase; and the song lyrics sung in the pre-existing digital recording. The sender user interface 151 provides the desired lyric phrase. Using these pieces of data, the audio extraction engine extracts the audio substantially associated with the desired lyric phrase from the pre-existing recording making it into a desired audio clip.

For example, suppose the pre-existing recording is the song "Bring It On Home To Me©" as sung and recorded by Sam Cooke. FIG. 13A is a pictogram of the time-domain audio signal of a pre-existing recording of this pre-existing recording. The song lyrics sung in this pre-existing recording are given in Table 1 below where the desired lyric phrase ("You know I'll always be your slave") selected by the sender 101 using sender user interface 151 has been highlighted in bold face letters.

TABLE 1

Lyrics of "Bring It On Home To Me ©" as sung by Sam Cooke

If you ever change your mind
About leavin', leavin' me behind
Oh, oh, bring it to me
Bring your sweet lovin'
Bring it on home to me, oh yeah
You know I laughed (ha ha) when you left
But now I know I've only hurt myself
Oh, oh, bring it to me
Bring your sweet lovin'
Bring it on home to me, yeah (yeah) yeah (yeah) yeah (yeah)
I'll give you jewelry, money too
And that's not all, all I'll do for you
Oh, oh, bring it to me
Bring your sweet lovin'
Bring it on home to me, yeah (yeah) yeah (yeah) yeah (yeah)
Yeah
You know I'll always be your slave
Till I'm dead and buried in my grave
Oh, oh, bring it to me
Bring your sweet lovin'
Bring it on home to me, yeah (yeah) yeah (yeah) yeah (yeah)
If you ever change your mind
About leavin', leavin' me behind
Oh, oh, bring it to me
Bring your sweet lovin'
Bring it on home to me, yeah (yeah) yeah (yeah) yeah (yeah)
Yeah (yeah) yeah (yeah)

In one approach to audio extraction the process/system can be thought to generally comprise two phases: first, an algorithm for finding segments ("vocal intervals") in the pre-existing recording that contain singing; and second an algorithm for mapping or fitting the song lyrics onto the vocal intervals identified by the first phase. The audio extraction engine may iterate back and forth between the Phase I and Phase II algorithms until a satisfactory fitting of the lyrics to the vocal intervals has been realized. Once this is achieved, the vocal interval containing the desired lyric phrase may be located from within the vocal intervals. FIG. 12 is an illustration of the flow between the various steps and processes undertaking by the audio extraction engine 151. The two phases are described in more detail below.

Phase I: Vocal Interval Identification
Step #1: Selection of Analysis Wavelet

There are identified in the art basic wavelets (also called wavelet templates or mother wavelets) that are well-suited for analyzing popular music. In Step #1 an initial scan of the digitized signal (FIG. 13A) in the pre-existing recording that does not take into account the lyrics may be performed to determine which of these basic wavelets is most appropriate for the particular pre-existing recording at hand.

As the number of basic wavelets well-suited for analyzing popular music is small—on the order of 10—one way of accomplishing the selection of the analysis wavelet is to apply each of the basic wavelets with their associated default popular music parameterization as given in the literature to the pre-existing recording and to pick the basic wavelet that yields the best result.

In our running example we will use the Blackman wavelet (without any intention that the invention be limited to the use of the Blackman wavelet), the basic form of which is:

$$\omega(t) = 0.42 - 0.5\cos\left(2\pi\frac{t}{\gamma}\right) + 0.08\cos\left(4\pi\frac{t}{\gamma}\right)$$

Step #2: Modify Current Analysis Wavelet Parameters

The mathematical specification of a basic wavelet includes parameters ("free variables") that must be given values in order to apply it to the music signal. In our running Blackman wavelet example, there is only one parameter, y. In Step #1 above, the parameters were given default values. In Step #2 the parameters of the selected basic wavelet currently being used for vocal interval identification may be modified. If this is the first time Step #2 has been executed, then the parameters of the basic wavelet may be adjusted to new values based on fundamental characteristics of the digital audio signal in the pre-existing recording. If this is not the first time Step #2 is being executed (e.g. Step #2 is being executed again after the execution of Steps #3 through Step #8), then the current parameter values are adjusted to new parameter values based on the details of the lack of fit of the lyrics to the vocal intervals computed in Step #8 below. The exact nature of this adjustment depends on the particular basic wavelet having been selected in Step #1 and currently being used to define the vocal intervals.

Step #3: Apply Wavelet to Song Signal

The fully parameterized wavelet determined in Step #2 is applied to the digitized signal in the pre-existing recording. The result is an m-by-n, time-by-frequency matrix of numbers where each number represents the amount of energy present in the song at a particular frequency at a particular time. An entry X at position $(m_1, n_1)$ in this matrix would for example mean that at $m_1$ milliseconds from the beginning of the song the amount of energy at frequency $n_1$ was X. X is typically a unitless numerical value indicating, for example, the ratio of the amount of energy present at frequency $n_1$ at time $m_1$ and the maximum energy at any frequency at time $m_1$.

FIG. 13B illustrates the application of the Blackman wavelet the pre-existing recording of "Bring It On Home to Me©" as sung and recorded by Sam Cooke. FIG. 13C is a close up of illustration of FIG. 13B at the desired lyric phrase ("You know I'll always be your slave").

Step #4: Detect Vocal/Non-Vocal Edges

We shall call the boundary or transition time moment between a time interval during which there is singing and a time interval during which there is no singing an edge. That is, an edge is a moment in time on one side of which there is singing and on the other side of which there is no singing.

The wavelet parameters have been adjusted in Step #2 so that when the resulting fully-parameterized wavelet is applied to the digital signal in Step #3 the time intervals during which there is singing are maximally differentiated from time intervals in which there is no singing.

In Step #4, then, the edges in the time-by-frequency matrix produced in Step #3 are identified and sharpened using edge detection algorithms known in the current art. These algorithms include but are not limited to:
  number of zero crossings
  low-energy ratio
  spectral centroid
  spectral roll-off
  spectral flux
  Mel frequency capstrum coefficients (MFCC)

Step #5: Calculate Strength of Each Edge

The edges identified by Step #4 will not be of equal clarity or definiteness. Some will be very distinct and obviously be boundaries between singing and non-singing. Others will be less distinct and could, for example, simply indicate that singing has gone from a high pitch to a low pitch, from a solo to a chorus, or from pianissimo to fortissimo. In Step #5 a numerical value is assigned to the definiteness or strength of each edge produced by Step #4. A high value on this measure indicates that it is highly likely that this edge is a singing/non-singing transition while a low value means the edge is less likely to be a singing/non-singing transition.

Step #6: Convert Edges to Vocal Intervals

Using the edge strengths produced in Step #5 the method next identifies edges which will be asserted to be the start of singing and edges that will be taken to be the stop of singing. For a start edge there is no singing before the edge and singing after the edge. For a stop edge there is singing before the edge and no singing after the edge. Start and stop edges must alternate. The time interval between a start edge and a stop edge shall be referred to as a vocal interval. The length of time between the start edge and the stop edge is the duration of the vocal interval.

Phase II: Mapping of Song Lyrics to Vocal Intervals

Step #7: Map Song Lyrics to Vocal Intervals

In Step #7 words in the song lyrics are assigned to the vocal intervals created by Step #6 such that the last lyric word placed in one vocal interval is the lyric word immediately before the first lyric word in the following vocal interval. Each lyric word is mapped to exactly one vocal interval.

By way of a pedagogical example, suppose there are 100 words, $w_1, w_2, \ldots w_{100}$, in the song lyric and suppose 10 vocal intervals, $I_1, I_2, I_{10}$, have been created by Step #6. Associating the first 10 lyric words, $w_1, w_2, \ldots, w_{10}$, with the first vocal interval $I_1$; the second ten lyric words $w_{11}, w_{12}, \ldots w_{20}$, with the second vocal interval $I_2$, and so forth would be a mapping however naïve of the song lyrics to the vocal intervals.

In performing this mapping one takes into account the phrase structure of the song lyric. Thus, using the above example, one would try to map the entire lyric phrase "You know I'll always be your slave" to a single vocal interval such that these lyric words would be the only words assigned to this vocal interval.

Step #8: Do the Vocal Intervals Fit the Song Lyrics?

In Step #8 an assessment is made as to how well Step #7 has mapped the song lyrics to the vocal intervals. Particular attention is paid to the fit of the interval containing the desired lyric phrase (3). If the overall fit as computed in Step #8 is satisfactory, if the fit of the desired lyric phrase is excellent, and if the start edge and the stop edge of the vocal interval containing the target lyric phrase are strong as measured in Step #5 then proceed to Step #9. If the fit is not satisfactory or if the vocal interval to which the target lyric phrase has been assigned is not well-defined then go back to Step #2 or Step #6 or Step #7.

Step #9: Create the Clip of the Desired Lyric Phrase

In the case that Step #8 determines that the overall fit of the vocal intervals to the song lyric is satisfactory and that the edges of the vocal interval containing the target lyric phrase are sufficiently strong, then the audio engine would extract the vocal interval containing the desired lyric phrase from pre-existing recording. This synchronization between the audio and the lyrics may be maintained for future use by the system, which could—among other things—support the sender's replay of synchronized audio with the selection of particular lyrics.

Although it is generally believed that the processes and apparatus used for audio extraction will perform appropriately, in one embodiment of the invention, the location of the identified segment digital recording within the digital recording may be displayed to a human operator for review, editing, adjustment and refinement before the final version of the desired audio clip is finally created. Similar processes may be provided for later manual revision of a desired audio clip that was snipped (or otherwise extracted) differently from the desired lyric phrase.

There are a number of assumptions regarding the nature of popular music and the selection of lyric phrases there from that can yield optimizations in the above canonical algorithm. For instance, the system may base optimizations on song defined lyrical phrases. Referring back to Table 1, "Lyrics of Bring It On Home To Me as sung by Sam Cooke" above it can be assumed that a desired lyric phrase is coterminous with a lyric phase in the song lyrics. For example, it is more likely that a desired lyric phrase is a phrase of the song lyrics such as "You know I'll always be your slave" rather than a subsequence of lyric that does not adhere to song lyric phrasing such as a desired lyric phrase as "your slave Till I'm dead" that consists of the end of one song lyric phrase and the beginning of the next song lyric phrase.

Incorporation of Visual Media

In some exemplary embodiments, the system described herein may be further expanded by the addition of visual media to accompany a "musical emoticon" or other audio clip that may be provided. According to an exemplary embodiment, it may be desired to couple a musical emoticon or other audio clip to a static image file; a dynamic image file such as an animated GIF, animated PNG (APNG), or other animated or dynamic image file; a video clip; or to any other visual media such as may be desired. For example, in some exemplary embodiments, a "musical emoticon" may be paired with a standard emoticon such as a smiley face or frowny face, or a standard emoticon modified as appropriate to better facilitate interaction with the audio clip; for example, a modified emoticon may include a static "play" button indicating that the emoticon is associated with a recording and should be selected by the recipient in order to play the recording.

According to an exemplary embodiment, during the start of the creation process, an image or video file (which may, for example, be a GIF) may be downloaded in addition to an audio file (which may, for example, be MP4 audio). In some exemplary embodiments, the image/video data (which may henceforward be referred to as visual data or a visual clip) may be related to the accompanying audio data, or may be provided as part of the same digital multimedia container format. For example, according to an exemplary embodiment, the visual data and audio data may be provided as part of the same MP4 file, which may be configured to store video, audio, still images, or other information such as may be desired (such as, for example, subtitle information which may be added to a clip as may be desired).

According to an exemplary embodiment, the audio data and visual data may be directly related to one another. For example, a movie having both video data and audio data may be provided, and a clip may be selected from the movie. It may be desired to pair the audio data of the movie with the video data of the movie for the extent of the clip, such that a recipient is shown a short segment of the movie that can function as the desired musical emoticon. In some exemplary embodiments, subtitle information may also be provided if paired with either the audio data or the visual data; in other exemplary embodiments, subtitle information may automatically be provided, or may optionally automatically be provided, based on the use of a speech-to-text engine applied to the audio clip.

According to an exemplary embodiment, once the audio data and visual data have both been downloaded, the audio and visual data may be combined. According to an exemplary embodiment, the combination of the visual data and the audio data may be performed in a layering process, wherein the first layer is the visual data (for example, the GIF data), and changes to the visual data may be applied as subsequent layers. For example, according to an exemplary embodiment, a next layer may be a lyrics layer that shows lyrics to the musical emoticon or other audio clip to be applied over the visual data. In an exemplary embodiment, a next layer after that may be an effects layer on which one or more visual effects may be provided. Other layers or combinations of layers may also be understood.

In an exemplary embodiment, the system may also be configured to perform filtering of the visual data either before or after one or more of the layers is applied. According to an exemplary embodiment, a user may have the option to, or the system may automatically perform filtering on the visual data after the first layer is loaded, or after one or more visual effects have been added in order to make the filtering on the visual effects more consistent with the filtering on the visual data. In some exemplary embodiments, a filtering process may visually change the underlying visual data on a pixel-by-pixel level, so that the underlying image or video is adjusted into a new image or video.

In an exemplary embodiment, a user may be able to specify one or more details of filtering to be applied, of lyrics to be overlaid on the visual data, and of visual effects to be applied to the visual data. For example, according to an exemplary embodiment, a user may be able to specify the size of the lyrics to be applied to the visual data, which may allow a user to manually determine what a proper balance is between the readability of the lyrics and the recognizability of the visual data; in another exemplary embodiment, a user may be able to specify the position of the lyrics to be applied to the visual data. Other customization by the user may be possible.

According to an exemplary embodiment, once all of the parameters that must be specified from the user are gathered, including the user specification of visual data and any customization that may be applied by the user, a new container file including the visual data and customizations (which may be, for example, a video file such as an MP4 file) may be generated on top of the originally-supplied visual data that had been supplied by the service. The new container file may then be uploaded to a server backend. Likewise, information about a song or other audio clip that the user has selected may be provided to a server backend.

Once the container file has been uploaded to a server backend, the server may add the information about the song or audio clip that the user has selected to the set of parameters. In an exemplary embodiment, the server backend may then combine the visual data in the container file with the song or audio clip that the user has selected. The backend may, in an exemplary embodiment, create one or more images in a format optimized for viewing on a particular application; for example, the backend may create one or more WEBP images for animation purposes in order to display the visual data or a preview of the visual data on an app. The backend may likewise store the original video and/or a compressed version of the original video for fast loading.

Figure 14:
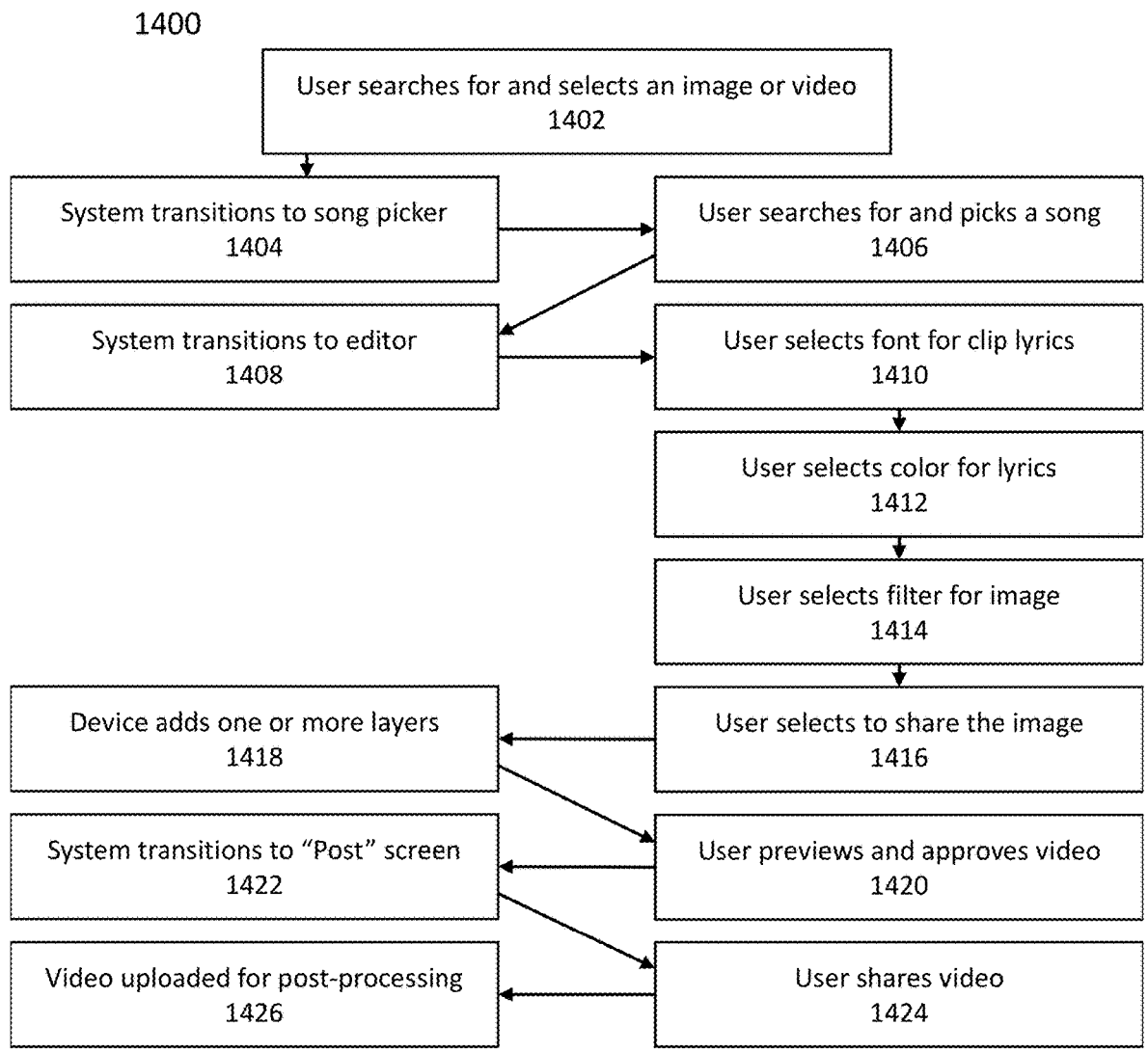
FIG. 14 illustrates the flow of one potential exemplary embodiment of a process by which a user may select and combine a visual media file (such as a GIF) and an audio media file into an audiovisual message note.

As such, according to an exemplary embodiment, the general process flow of a system 1400 including both audio and visual data, which may allow a user to select an image or clip as well as a "musical emoticon" or other audio clip, may proceed essentially as follows and as depicted in exemplary FIG. 14. In a first step 1402, a user may search for and select an image or video, such as a GIF, on a user interface. In a next step 1404, the system may transition to a song picker and provide the song picker on the user interface. In a next step 1406, the user may then search for and pick a song. The system may then transition to an editor and may provide an editor on the user interface 1408, whereby the user can provide customization of the visual or audio data. The user may then select an appropriate font in which the clip lyrics may be provided 1410, may provide a color in which the lyrics may be provided 1412, may provide one or more filters for the visual data 1414 to be applied before or after the application of the lyrics, and may provide any other feedback that may be desired or required. In an exemplary embodiment, the user may then select to share the image or video that they have customized 1416.

Once the user has selected to share the image or video 1416, the system may then add a layer of lyrics, a layer of effects, and/or a watermark layer, in some order, to the image or video data, and may generate a new video from the layered data 1418. In some exemplary embodiments, this may be performed by the user's device or by a specific application on a user's device, and in some exemplary embodiments this may be performed by a server, or a combination of the two.

In a next step, a preview image or video may be provided to a user 1420, which may alternatively be referred to as a "sticker." The user may have the option to go back and adjust one or more of the settings, selections, or customizations that they had previously provided in order to generate a new image or video and a new preview image or video 1420. For example, according to an exemplary embodiment, a user may determine that the visual effect created by combining the image or video data with a particular song clip does not provide the desired effect, and may wish to select another image, other video data, or another song clip; for example, a user may wish to select a video clip from slightly later in a movie that the video clip was drawn from, so that the starting and ending times of the video clip and the starting and ending times of the audio clip that the user has selected match up more accurately, or so that certain parts of the video clip are aligned with certain parts of the audio clip. A user may select, at a preview screen 1420, to go back and select a new video clip. In another example, a user may determine that the filter they selected does not work well for a particular video, or may determine that lyrics provided in a certain color may not create a desirable visual effect.

Once the user has previewed and approved a preview image or video, the system may transition to a "post" screen 1422 and a user interface may provide a "post" screen on which the user can elect to post the video that they have created. This may, for example, allow a user to share the video to social media 1424, or share the video with one or more recipients by SMS, email, or some other communications method.

According to an exemplary embodiment, the video created by the user may then be provided to a server backend, for example by uploading the image or video to the server backend from a user's device 1426. In such a step, further processing may be performed, such as may be desired; for example, according to an exemplary embodiment, a server backend may compress the video, may store metadata of the video, or may create one or more preview images to be displayed when the video is previewed or searched for. In an exemplary embodiment, the video may also be indexed and may be made searchable by other users, who may wish to express similar sentiments as the first user did when creating the video in question.

Figure 15A:
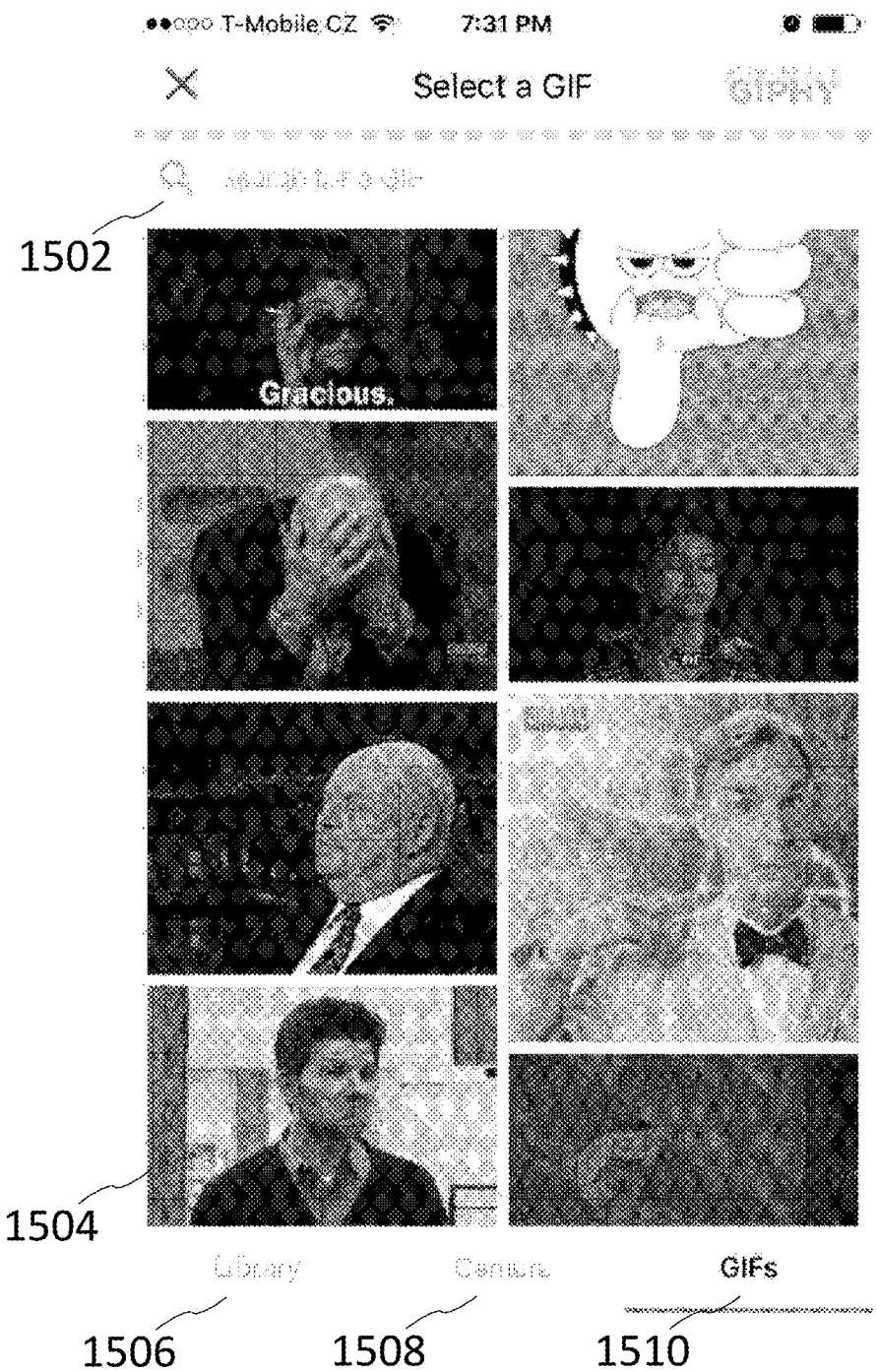
FIG. 15A illustrates an exemplary interface through which a user can select a visual media file.

Turning now to exemplary FIG. 15A, FIG. 15A shows an exemplary embodiment of a visual media selection screen 1500 by which a user can select one or more images or videos to pair with an audio clip. According to an exemplary embodiment, a visual media selection screen 1500 may have a search utility 1502 by which a user may perform a keyword search of a selection of images or video content (for example, a library of GIF images), may show a list of images or preview images 1504, and may provide the user with options to select between a personal library of images and video content 1506, an option to create an image or video content with a camera 1508, or a list of available image or video content 1510.

According to an exemplary embodiment, a user may be able to search for images or video content based on any keyword search methodology or based on manual searching through unsorted or relatively unsorted lists of visual media, such as may be desired. For example, according to an exemplary embodiment, images or video files may be associated with tags, and a user may conduct a search by searching for one or more of the tags; a search engine may then associate the user's search query with one or more tags of the images and may provide the most relevant images. For example, according to the exemplary embodiment shown in FIG. 15, one or more different gifs or videos may be shown as a result of the search. In addition to tags as a search mechanism, the user's and recipient's demographics, conversational context, and geolocations could also be used to provide lists of suggested media for use in a message.

Figure 15B:
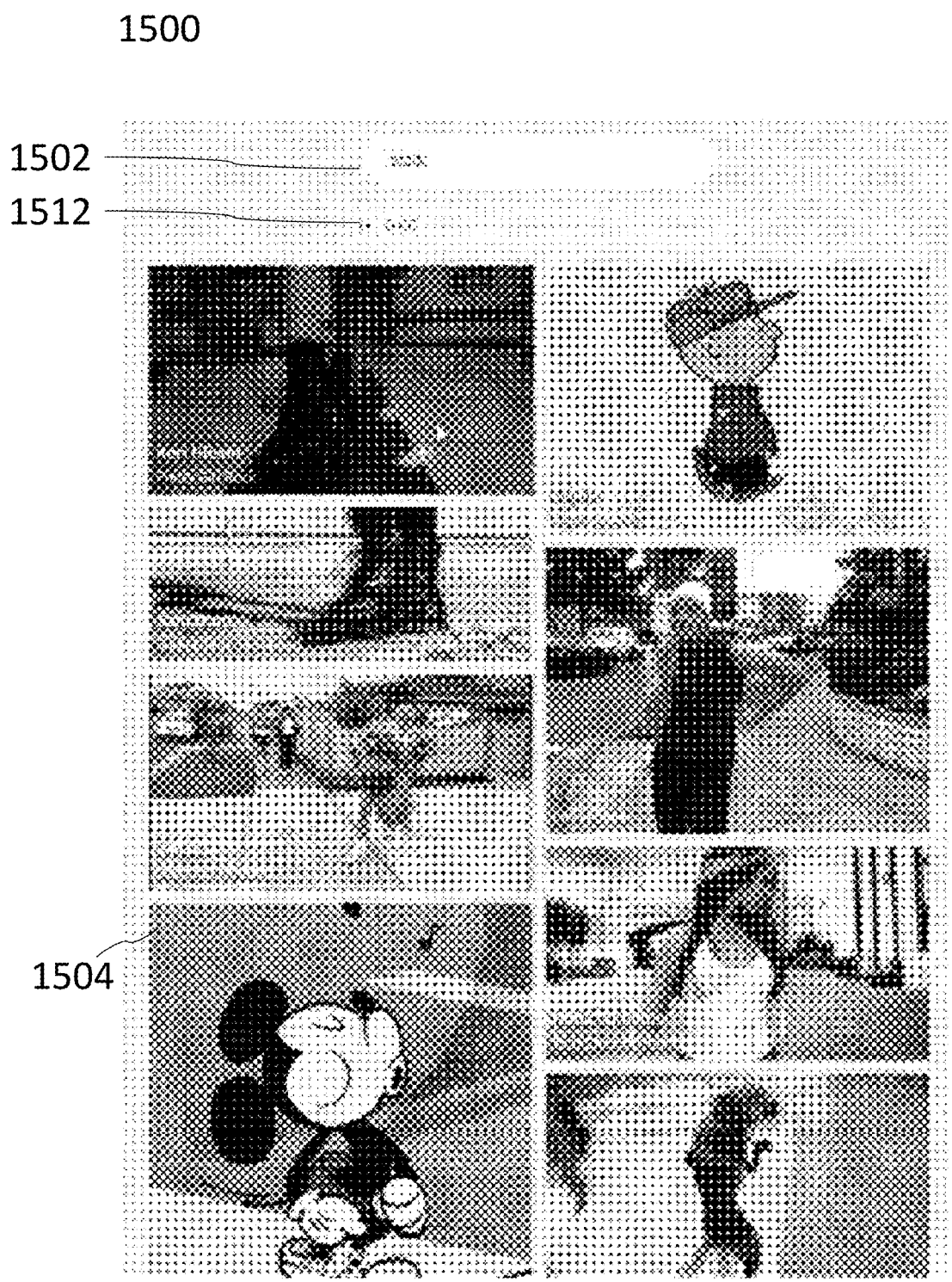
FIG. 15B illustrates an exemplary interface through which a user can select a visual media file.

Turning now to exemplary FIG. 15B, FIG. 15B shows an exemplary embodiment of a visual media selection screen 1500 by which a user can select one or more images or videos to pair with an audio clip. According to an exemplary embodiment, a user may have searched, in the search bar 1502, for "walk," and a number of visual media files may be shown that are relevant to this search term. In some exemplary embodiments, a user may be provided with categories of images or videos, such as, for example, images related to physical activity, images related to emotions, or images related to any other category such as may be desired. In some exemplary embodiments, images or videos may be associated with a particular category or search term by, for example, the use of tags; in other exemplary embodiments wherein a video file is a video clip taken from a movie or other video that has sound or dialogue, the video file may be placed in a category or associated with a search term based on the sound or dialogue. Other methods by which a user can search 1502 for one or more images or video files may also be understood. According to an exemplary embodiment, a visual media selection screen 1500 may additionally show one or more images or video files that have been previously combined with an audio media file, and as such a visual media selection screen 1500 may have a play button 1512 by which a user can play the audio media file associated with a particular image file 1504. This may allow a user to reuse an audiovisual message note that has already been created by another party; a user may select a static image, dynamic image, or video in the list of visual media files 1504 and may proceed immediately to an editing screen after making this selection.

Figure 16:
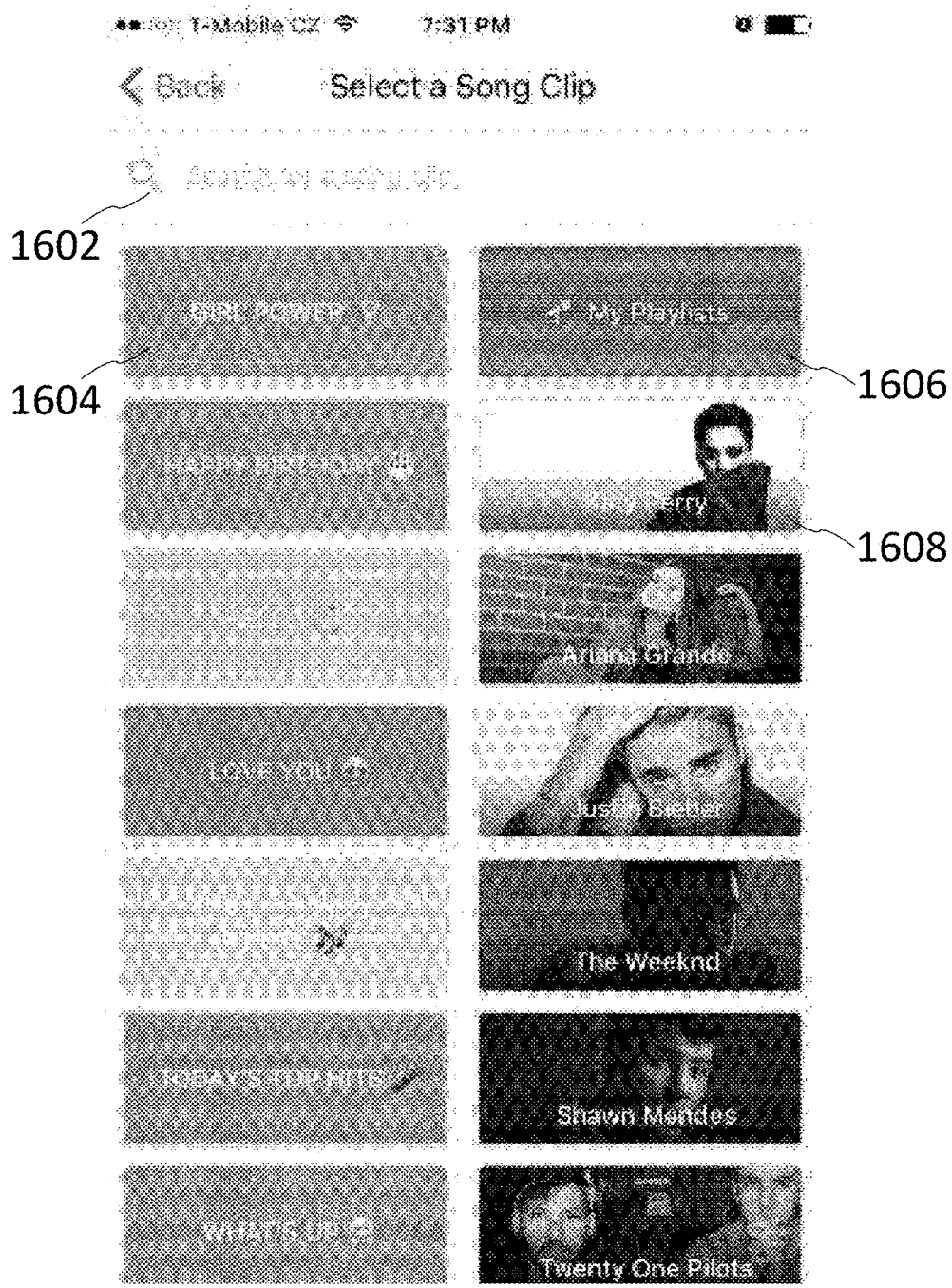
FIG. 16 illustrates an exemplary interface through which a user can select an audio media file.

According to an exemplary embodiment, once the user has selected one or more images or video on the visual media selection screen 1500, the user may then be taken to an audio clip selection screen 1600 such as may be shown in exemplary FIG. 16. According to an exemplary embodiment, an audio clip selection screen 1600 may allow a user to select one or more audio clips to pair with their visual content, and may have a search utility 1602 by which a user may perform a keyword search of a selection of audio content (such as songs, which may, for example, be keyword searched by lyrics). An audio clip selection screen 1600 may further provide the user with a set of categories into which songs are sorted 1604, which the user may select in order to access a list of songs that are relevant to that category. An audio clip selection screen 1600 may further provide the user with an option to access one or more playlists they have configured 1606. In an exemplary embodiment, an audio clip selection screen 1600 may access one or more music services on which the user may have saved a playlist, such as, for example, SPOTIFY, and may be configured to retrieve one or more of the user's personal playlists from that service; an audio clip selection screen 1600 may further be configured to access a custom playlist of another user, such as may be desired. Finally, an audio clip selection screen 1600 may provide the user with an option to select the songs of one or more artists 1608.

Figure 17A:
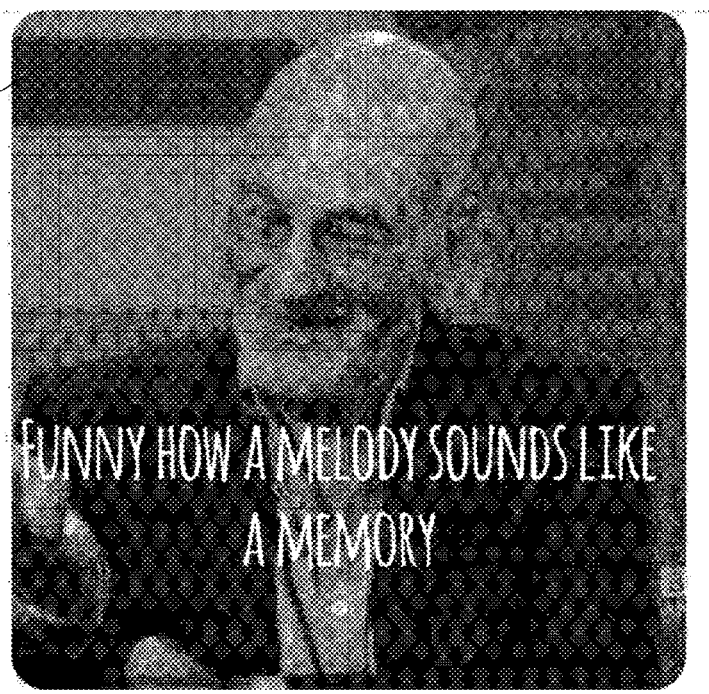
FIG. 17A illustrates an exemplary interface through which a user can edit a visual media file in order to edit the font of a text lyric provided on the visual media file.
Figure 17A:
Figure 17A:
Figure 17A:
Figure 17A:
Figure 17B:
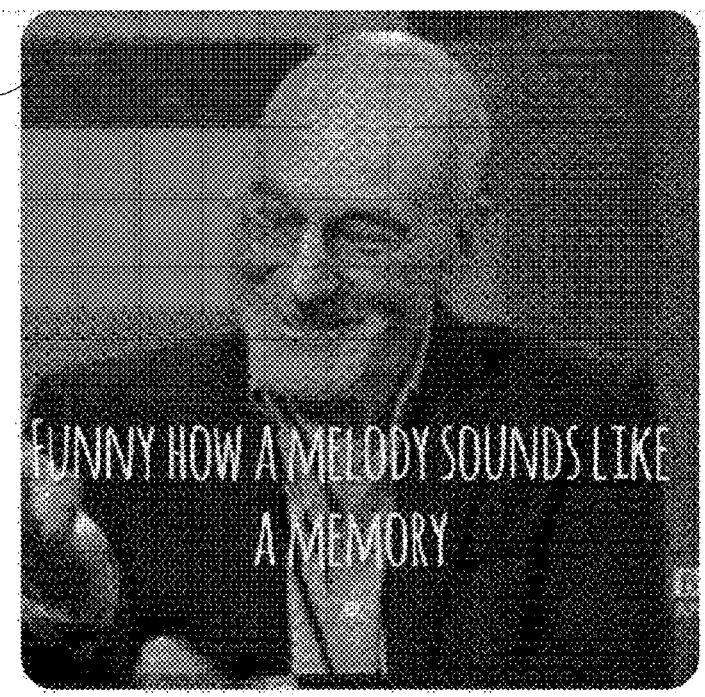
FIG. 17B illustrates an exemplary interface through which a user can edit a visual media file in order to edit the color of a text lyric provided on the visual media file.
Figure 17C:
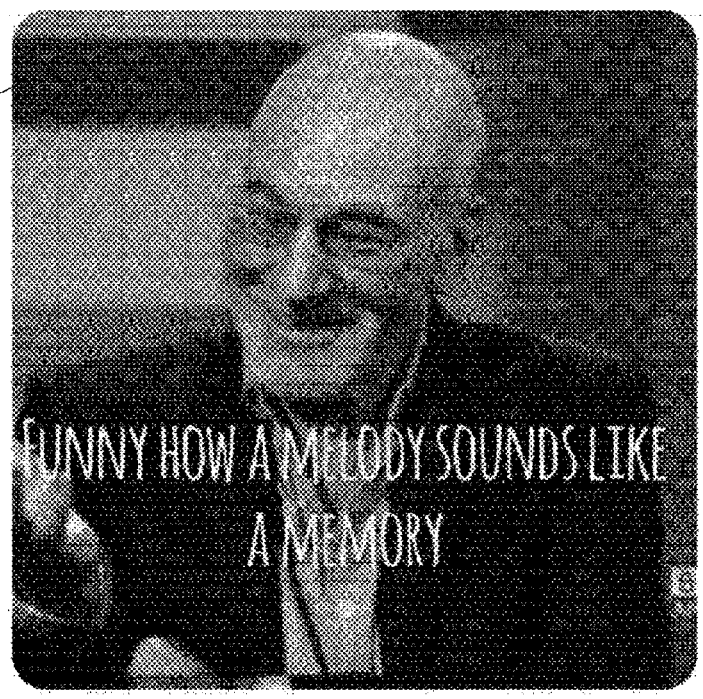
FIG. 17C illustrates an exemplary interface through which a user can edit a visual media file in order to apply one or more filters to the visual media file.
Figure 17C:
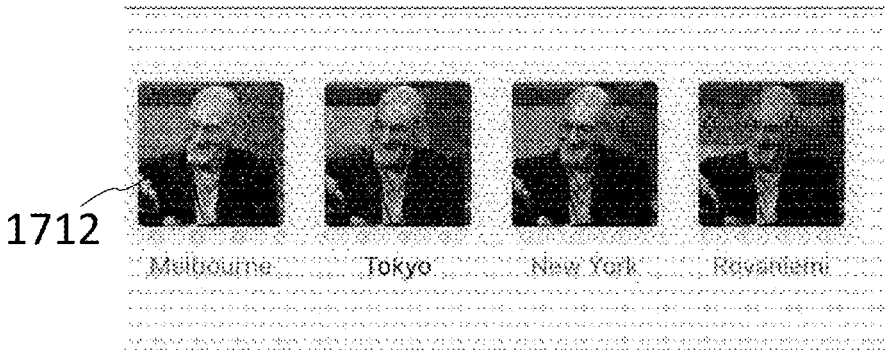

Once the user has selected one or more audio clips on the audio clip selection screen 1600, the user may then be taken to an editing screen 1700, such as may be shown in FIGS. 17A to 17C. According to an exemplary embodiment, an editing screen 1700 may display an image preview 1702 by which a user may be able to view a preview of an image or video based on the edits or additions that the user has made thus far, including, for example, the addition of lyrics or other font, or the addition of visual effects or filtering. It may be appreciated that the user can add any text or wording as desired, so as to provide further customization of message for the intended recipient or recipients. Further, it may be appreciated that, in editing screen 1700, a user may edit the length of an image or video, edit a length of audio or text they desired to associate with an image or video, splice any desired audio, video, or text information into an image or video, or string together various images, videos, or text, as desired. Alternatively, as desired, the text of a message may be provided to the intended recipient in audio format so that the intended recipient would hear the message upon receiving, opening, or playing the message.

According to an exemplary embodiment, a user may have a variety of tools 1704 provided in an editing screen 1700, which the user may use in order to make different additions or edits to the image or video in question. For example, according to an exemplary embodiment, a user may have a "songs" dialog through which the user may select another audio clip to be paired with the image or video, a "font" dialog through which the user may select a different font to use to display the lyrics paired with the image or video, a "color" dialog through which the user may recolor the lyrics, a "length" filter dialog through which the user may change the length of a video or audio data, and a "filter" dialog through which the user may apply one or more filters to the image or video.

Looking specifically at FIG. 17A, FIG. 17A displays an exemplary embodiment of a font selection menu 1706 that may be displayed when the user selects a font selection tool in a tool list 1704. According to an exemplary embodiment, a user may be provided with a variety of preselected fonts, such as, for example, Amatic or Ayuma; in another exemplary embodiment, a user may be able to load in their own font, if desired.

Looking next at exemplary FIG. 17B, FIG. 17B displays an exemplary embodiment of a color selection menu 1708, 1710 that may be displayed when the user selects a color selection tool in a tool list 1704. According to an exemplary embodiment, the color selection menu 1708, 1710 may include a plurality of sliders, which may include, for example, a hue selection slider 1708 that the user may use to select a hue of font to be applied to the image or video, and a brightness selection slider 1710 that the user may use to select a brightness value of font to be applied to the image or video. According to an exemplary embodiment, the hue and brightness values may apply to all font in the image or video; according to another exemplary embodiment, the hue and brightness values may be set for individual text objects or parts of a text object.

In another exemplary embodiment of FIG. 17B, it may be appreciated that one or more selection menus 1708, 1710 may be sliders to adjust the length of a video clip or audio data. According to an exemplary embodiment, the length menu 1708, 1710 may include a plurality of sliders, which may include, for example, a video slider 1708 that the user may use to select a runtime of a video, and an audio or text 1710 that the user may use to select a length of time or audio data to be played or text data to appear on, for example, an image or video. Thus, in this exemplary embodiment, a user could pare down an existing audio, video, or text snippet to a desired length of time. Alternatively, a user could select another menu option to loop any desired audio, video, or text data. Further, through another menu option, a user could select a second (or third, fourth, etc.) audio, video, or text data which could be inserted at a desired time into an existing image or video. For example, a secondary video file could be selected and edited to be displayed immediately following a first video file and desired text or audio could be provided on both videos or the text or audio could be utilized whereby the first video transitions to a second video at a desired time in the audio or text data. Alternatively, user could string together two or more audio or video clips and mate them to the run time of video or audio clip, respectively. Thus, it is envisioned that in the exemplary embodiment, a user could edit any one of audio, video, and text files or data as desired in order to create a custom or unique message to send to another party. Further, the user can create custom length or looped audio and video clips which may then be saved in a personal library or otherwise shared on a network. Such custom length audio and video clips can be generated through the embodiments shown in exemplary FIGS. 17A-C and may then be utilized at later times and/or by other users, as desired.

Looking next at exemplary FIG. 17C, FIG. 17C displays an exemplary embodiment of a filter selection menu 1712 that may be displayed when the user selects a filter selection tool in a tool list 1704. In an exemplary embodiment, one or more filters may be provided, which may include any corrective filter, artistic filter, or special effects filter that may be desired, and which may have names related to their function (such as "saturation filter") or may have any other names, as may be desired. For example, according to an exemplary embodiment, the filters to be provided may be named after famous cities (such as "Melbourne, Tokyo, New York, and Rovaniemi"), with the name of the city that corresponds to a filter being intended to be evocative of the effect of the particular filter. (For example, in an exemplary embodiment, a filter named after a city at high latitude may yield a darker or higher-contrast image than another filter.)

Figure 18:
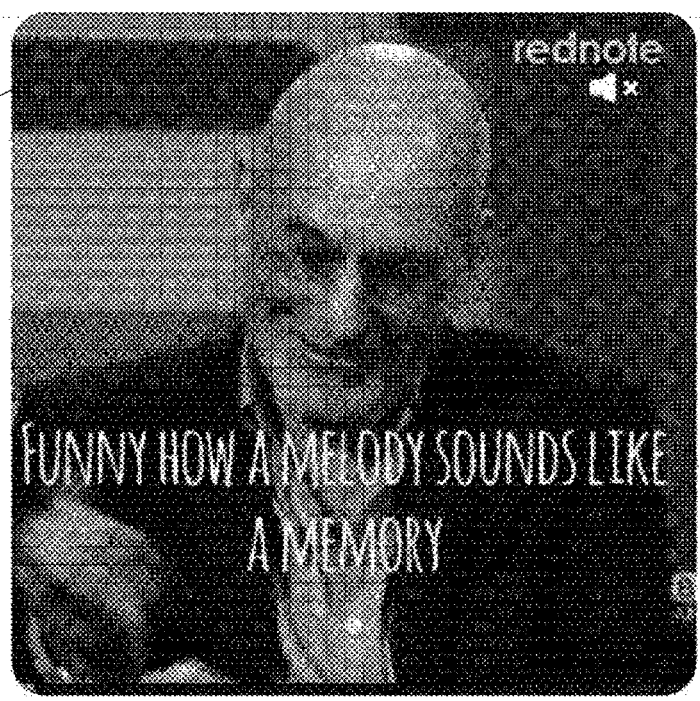
FIG. 18 illustrates an exemplary embodiment of a preview page by which a user can preview an image representative of an audiovisual message to be sent.
Figure 18:
Figure 18:
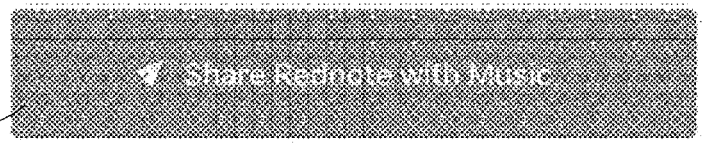

Once the user has applied the filters that they may wish to apply, the user may then have the option to preview a final version of a video to be generated. According to an exemplary embodiment, the user may be taken to a preview screen 1800 such as may be shown in FIG. 18. According to an exemplary embodiment, a preview screen 1800 may show a preview image 1802 showing all of the changes that have been made to the video through the editing process. The preview screen may further show an indication of which songs or other audio clips have been selected for use in the video 1804; for example, according to an exemplary embodiment, Bruce Springsteen's "Eric Church" may be selected, and in particular the lyric "Funny how a melody sounds like a memory" may be selected.

The preview screen 1800 may further provide an option to link the user interface with a social media account, or to show that the user interface has been linked with a social media account, and may provide an option by which the user can share the video on one or more social media accounts 1806. For example, a user may click the link "Share Rednote with Music" 1806 once the video has been finalized, which may provide the user with a number of options of where they can share the video.

Figure 19:
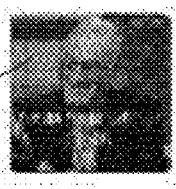
FIG. 19 illustrates an exemplary embodiment of a sharing screen by which a user may share an audiovisual message using one or more communications methods.
Figure 19:
Figure 19:
Figure 19:
Figure 19:
Figure 19:
Figure 19:
Figure 19:
Figure 19:
Figure 19:

For example, according to an exemplary embodiment, a sharing screen 1900 such as may be depicted in exemplary FIG. 19 may be provided. According to an exemplary embodiment, a sharing screen 1900 may provide an option for the user to post the video 1902 once they have customized how it will be shared to their liking, may provide a preview of the video 1904, and may provide a variety of options to control how and with whom the video may be shared. For example, according to an exemplary embodiment, a sharing screen 1900 may provide a text entry field 1906 by which the user may enter text to be provided along with the video 1904 in a social media post. The sharing screen 1900 may also provide a selection box 1908 for social media websites which have a "feed," "wall," or equivalent by which a user may broadcast their video to the world at large; for example, according to an exemplary embodiment, the user may select 1910 whether or not to post the video on their TWITTER feed as well. An option not to post the video to the user's TWITTER feed may currently be selected 1910.

According to an exemplary embodiment, a user may have the option to send the video as a private message rather than publishing the video as a public posting. According to an exemplary embodiment, a selection box 1912 may be provided by which the user may select to send the video to one or more recipients as a private message. For example, according to an exemplary embodiment, a user may be able to link the application with a FACEBOOK account (or any other social media website or application) and may be able to send the video as a FACEBOOK private message; may be able to link the application with a phone number and may be able to send the video via SMS or MMS text message; may be able to link the application with a FACEBOOK MESSENGER application and may be able to send it in that way; may be able to link the application with an INSTAGRAM account and send the message in that way, and so forth.

According to an exemplary embodiment, the user may also be able to save the video as a file 1914, which may either be stored locally or may be attached to and sent via one or more services (such as email) which may require the video to be provided as an attached file. For example, in an exemplary embodiment, a user may have the option to save the video to a camera roll of their device, or may have the option to send the video as an email attachment. Other methods by which the user may provide the image to another party may be understood.

In some exemplary embodiments, it may be desired to provide similar access control to a video or audiovisual message note in a similar manner to how access control may be provided for an audio message note. For example, according to an exemplary embodiment, it may be desired to require a recipient to create a user account for a service and to log into the service with their user account before they will be provided with the content of the audiovisual message note; this may be similar to access control discussed previously that may require a recipient to log into the service with a user account in order to view an audio message.

According to an exemplary embodiment, a system may provide a user with a utility to create audiovisual message files by the use of an editor such as is described above, but may also generate one or more audiovisual message files automatically, or may alternatively generate a library of audiovisual message files automatically instead of providing an editor. For example, according to an exemplary embodiment, a relevance determination system may be used in order to match appropriate visual media files to appropriate audio files (or, for example, to match visual media files to audiovisual files, audio files to audiovisual files, or audiovisual files to other audiovisual files) in order to populate a library from which users can select. In an exemplary embodiment, a user may be able to further edit audiovisual files provided in this manner into a final audiovisual message file, if desired.

According to an exemplary embodiment, a relevance determination system may calculate a relevance score for visual media files, audio files, and/or audiovisual files, and may then create one or more audiovisual files for use in audiovisual message files by combining relevant audio/visual/audiovisual files. For example, an exemplary embodiment of a relevance determination system may associate pairs of GIF image files and audio clips that are determined to be relevant to one another. In an exemplary embodiment, in order to calculate this relevance information, a relevance determination system may determine relevance scores for the visual media files (such as GIFs) and may determine relevance scores for audio media files (such as music clips).

According to an exemplary embodiment, a relevance score of a GIF or other visual media file (or other file including visual media content) may be calculated as follows. A relevance determination system may determine any or all of three pieces of data: the tags with which the visual media file is associated, the external popularity of the visual media file, and the internal popularity of the visual media file.

According to an exemplary embodiment, each visual media file (or some selection of the visual media files) may be provided with a list of tags which may describe the file, such as one or more characters or places featured in the file or one or more visual aspects of the file. A relevance determination system may compare the list of tags of the visual media file to a master list of popular tags, and may determine similarity information from this comparison. For example, according to an exemplary embodiment, a relevance determination system may generate and return a similarity score, from zero to one, which may indicate how well the tags of the visual media file relate to the popular tags stored by the relevance determination system. (In some exemplary embodiments, a list of popular tags may be manually provided, may be generated from analyzing the tags most commonly used by users of an audiovisual message service, may be generated from scraping other social media content, or may be generated through any other method such as may be desired.)

According to an exemplary embodiment, each visual media file (or some selection of the visual media files) may have an external popularity score or external popularity information indicating how popular the visual media file is with a broad set of users, such as general internet users. For example, according to an exemplary embodiment, an external popularity score may be determined by a position in search rankings of the particular visual media file in one or more search engines, or in an aggregation of search engines. For example, the popularity of a GIF image may be determined by its position in the search rankings of an image searching search engine (such as, for example, GOOGLE IMAGE SEARCH or dedicated GIF search engines such as TENOR or GIPHY), the popularity of a video may be determined by its position in the search rankings of a video searching search engine (such as, for example, YOUTUBE search results), or the popularity of any visual media file may be determined by the position in the search rankings of a site on which the visual media file has been posted. According to an exemplary embodiment, the external popularity of a visual media file may also be determined, or may alternatively be determined, by sharing activity for the visual media file; for example, a visual media file that has been shared a large number of times through a visual media file sharing service (such as TENOR or GIPHY) or a visual media file that has been shared in a message or posting that has been viewed a large number of times (such as a visual media file retweeted frequently on TWITTER) may have a larger external popularity score. Other methods of calculating an external popularity score (such as, for example, a number of views or clicks on an advertisement having the visual media file, the presence of the visual media file in a popular movie or television show, and so forth) may also be understood and may be used if desired.

According to an exemplary embodiment, each visual media file (or some selection of the visual media files) may have an internal popularity score or internal popularity information indicating how popular the visual media file is with a narrow set of users, such as users of the service, "power users" of the service such as premium or paid users of the service, employees of the company providing the service, or any other users such as may be desired. For example, according to an exemplary embodiment, an internal popularity score may be generated based on a number of shares of a visual media file within a service (for example, in the form of an audiovisual message note) or may be generated based on a number of times the visual media file has been selected in a search. Other information, such as, for example, a number of times the visual media file has been provided in a list of search results without being selected may also be taken into account; for example, if the visual media file is often returned as search results and very rarely selected, it may be considered to have too high of an internal popularity score, and its internal popularity score may be adjusted downward.

According to an exemplary embodiment, a visual media relevance score may be calculated from one or more of the tags, the external popularity, and the internal popularity, such as from a tag relevance score, an external popularity score, and an internal popularity score. In some exemplary embodiments, one or more of these scores may be absent (for example, a visual media file may have been newly added to the service and may not have internal popularity information associated with it yet) and a visual media relevance score may be calculated based off of the other score or scores.

According to an exemplary embodiment, a relevance score of a music clip or other audio file (or other file including audio content, such as a movie clip or other audiovisual file) may be calculated as follows. A relevance determination system may determine any or all of three pieces of data: the tags with which the audio file is associated, the external popularity of the audio file, and the internal popularity of the audio file. In an exemplary embodiment, this information may also be combined with song metadata or other audio file metadata, for example if such is available.

According to an exemplary embodiment, song metadata or other audio file metadata may include, for example, attributes of the song like the song artist, the title of the song, the genre of the song, the lyrics of the song, and the release year of the song. In other exemplary embodiments, such as, for example, embodiments where an audio file is a clip from a movie or TV show, similar metadata information may be provided if desired. According to an exemplary embodiment, a user may be able to query a repository of audio file information by searching for one or more attributes in the song metadata, such as, for example, a set of tags, lyrics, artists, titles, genre, release year, or a combination of song metadata attributes. It may be appreciated that any or each of the metadata attributes, as well as other user-defined search terms, may be utilized in searches for desired audio or visual files.

According to an exemplary embodiment, each audio file (or some selection of the audio files) may be provided with a list of tags which may describe the file, such as one or more expressions, moods, reactions, or keywords of the audio file or of media that includes the audio file. (For example, if the audio file is a song clip, one or more keywords may be associated with the song as a whole rather than the song clip; if the audio file is a movie clip, one or more keywords may be associated with the movie.) In an exemplary embodiment, a relevance determination system may compare some or all of the list of tags of the audio file to a list of tags, such as search queries or a master list of popular tags, and may determine similarity information from this comparison which may be used to generate a relevance score. For example, if a user has searched for three tags in particular, and a particular audio file has two of the tags and a similar third tag (a synonym for the third tag that the user searched for) the audio file may be determined to be highly relevant. Alternatively, if a given visual media file has certain tags, and an audio file has a similar set of tags, a combination of them may be generated and the resulting audiovisual file may be placed in a repository. In an exemplary embodiment, tags on these or other files may be generated manually by employees, may be generated manually by users (and optionally approved by employees or voted on by users, if desired), may be generated automatically (for example, a tag may be generated for an audio file if the audio file does not have the tag but if users who search for the tag commonly select the audio file), or may otherwise be generated, as may be desired.

According to an exemplary embodiment, each audio file (or some selection of the audio files) may have an external popularity score or external popularity information indicating how popular the audio file is with a broad set of users, such as general internet users. For example, according to an exemplary embodiment, an external popularity score may be determined by a position in search rankings of the particular audio file in one or more search engines, or in an aggregation of search engines. For example, the popularity of a song may be determined by its position in the search ranking of one or more music services (such as ITUNES, PLAY MUSIC, SPOTIFY, or other such services) or any other popularity metrics of such services (such as a number of users that have saved or downloaded the song), the popularity of a video may be determined by its position in the search rankings of a video searching search engine (such as, for example, YOUTUBE search results), or the popularity of any audio file may be determined by the position in the search rankings of a site on which the audio file has been posted. According to an exemplary embodiment, the external popularity of an audio file may also be determined, or may alternatively be determined, by sharing activity for the audio file; for example, an audio file that has been shared a large number of times through an audio file sharing service or an audio file that has been shared in a message or posting that has been viewed a large number of times (such as an audio file retweeted frequently on TWITTER) may have a larger external popularity score. Other methods of calculating an external popularity score (such as, for example, a number of views or clicks on a video advertisement having the audio file, the presence of the audio file in a "top 100" list or similar list or its appearance in a popular movie or television show, and so forth) may also be understood and may be used if desired.

According to an exemplary embodiment, each audio file (or some selection of the audio files) may have an internal popularity score or internal popularity information indicating how popular the audio file is with a narrow set of users, such as users of the service, "power users" of the service such as premium or paid users of the service, employees of the company providing the service, or any other users such as may be desired. For example, according to an exemplary embodiment, an internal popularity score may be generated based on a number of shares of an audio file within a service (for example, in the form of an audiovisual message note) or may be generated based on a number of times the audio file has been selected in a search. Other information, such as, for example, a number of times the audio file has been provided in a list of search results without being selected may also be taken into account; for example, if the audio file is often returned as search results and very rarely selected, it may be considered to have too high of an internal popularity score, and its internal popularity score may be adjusted downward.

According to an exemplary embodiment, an audio relevance score may be calculated from one or more of the tags, the external popularity, and the internal popularity, such as from a tag relevance score, an external popularity score, and an internal popularity score, as well as from the song metadata. In some exemplary embodiments, one or more of these scores may be absent (for example, an audio file may have been newly added to the service and may not have internal popularity information associated with it yet) and an audio relevance score may be calculated based off of the other score or scores.

Once an audio relevance score and a visual media relevance score have each been calculated, the relevance scores of the audio and the visual media may be used to generate a final combination of audio and visual media files into an audiovisual message file. This may ensure that the audiovisual message files that are generated and stored in a repository make use of the most popular or relevant combinations of audio and visual media files, such as GIFs and music clips, in order to generate highly relevant audiovisual message files.

In still another exemplary embodiment, and referring back to FIG. 1A, audio extraction engine 152 may function independently of user input into the application. In such an embodiment, audio extraction engine 152 may work, for example utilizing computer vision, to create a database of music and/or video snippets that are available for a user to select based on search criteria. Thus, database 160 may house or be pre-populated with any number of music and/or video snippets that have audio, video, or any desired combination thereof corresponding to a number of phrases or text data, emotions, or other content, as desired. For example, the application may provide a list of emotions, such as those shown in FIG. 11, including happy, sad, lonely, excited, and angry. These emotions may be associated with any number of corresponding audio or visual snippets that convey this emotion. Thus, upon selection of one option, the application may display (or provide an audio menu) of related audio and visual snippets that relate to that emotion.

Further, audio extraction engine may be implemented in a variety of manners in this exemplary embodiment. For example, a text search may be performed across the lyrics of a variety of songs or transcriptions of videos (or other visual files, such as gifs). Results aligning with the searched text may be clipped by software or manually from the appropriate song or video and the portion of the song or video corresponding to the desired text may be stored in database 160 and categorized appropriately. The categorization may be performed using metadata in records 161a, 161b, etc., as discussed above. Thus, when a search is performed on the application for a certain phrase, emotion, or other search characteristic, the appropriate results generated by the audio extraction engine 152 may be returned and provided as options for selection.

In still further exemplary embodiments, audio extraction engine 152 may be utilized to automatically categorize audio or visual snippets based on the audio or visual elements themselves. Here, engine 152 could be utilized to systematically identify text, subjects, or themes associated with audio or visual file content. For example, any file containing audio could be keyword searched for certain emotions (e.g. "happy") or activities (e.g. "celebrate") and be tagged with appropriate metadata for categorization. Additionally, audio extraction engine 152 may use various other elements to interpret and predict qualities of the files. For example, if an audio or visual snippet has a fast beat or quick tempo, it may be tagged with appropriate metadata, such as "upbeat", "active", "hard work", or the like. Similarly, if there is a slow beat or slow tempo, it may be tagged as "calm" and other related tags. Other factors, such as the rate of change of displayed data, the duration of a gif or how long it takes to repeat, can similarly be used to apply metadata and categorize audio and visual data automatically. In one further example, if certain color schemes, such as red and green, are detected, the file could be tagged with "holiday", "winter", and the like. It may be further appreciated that qualifying factors for the application of certain metadata can be utilized. For example, having more than a predefined number of beats in a five second segment may correlate to high likelihood of an audio snippet being tagged with "upbeat". Following the automatic review and tagging with metadata, the files may be uploaded and stored as otherwise described herein. Further, it may be appreciated that metadata tagging or other categorization of files could be done manually, through crowdsourcing, or voting, as desired. Additionally, with respect to photos that may be uploaded and included in the above, EXIF data associated with the photos may be used to provide categorization cues and be utilized for metadata tagging.

The foregoing description and drawings merely explain and illustrate the invention and the invention is not limited thereto. While the specification in this invention is described in relation to certain implementation or embodiments, many details are set forth for the purpose of illustration. It will thus be appreciated that those skilled in the art will be able to devise various arrangements which, although not explicitly described or shown herein, embody the principles of the invention and, thus, fall within its scope and spirit.

What is claimed is:

1. A computer program product embodied on a non-transitory computer readable medium, comprising code executable by a computer having a processor and a user interface and arranged to communicate with at least one audio and visual file messaging software-as-a-service platform, to cause the computer to carry out the following steps:
   accessing the at least one audio and visual file messaging software-as-a-service platform;
   communicating to the at least one audio and visual file messaging software-as-a-service platform a set of first information, the set of first information including a message personalized for an intended recipient;
   selecting, via the user interface, at least one category of pre-existing audio and visual files to be retrieved, said pre-existing audio and visual files classified into at least one predetermined category;
   retrieving, from the at least one audio messaging software-as-a-service platform, a plurality of pre-existing audio and visual files, said plurality of pre-existing audio and visual files associated with the at least one selected category and comprising a snippets of longer audio and visual files, wherein each of the plurality of pre-existing audio and visual files further comprise a desired phrase;
   amending at least one audio and visual file that comprises a desired phrase from the plurality of pre-existing audio and visual files; and
   directing the at least one audio and visual file messaging software-as-a-service platform, via the user interface, to generate and output the amended audio and visual file and deliver the amended file as a message of at least one of audio and visual data for the intended recipient.

2. The computer program product embodied on a non-transitory computer readable medium of claim 1, further comprising:
   generating, via an audio extraction engine, the plurality of audio/visual files;
   associating metadata regarding the content of the plurality of audio/visual files to each of the audio and visual files in the plurality of audio/visual files; and
   storing the plurality of audio/visual files in a database.

3. The computer program product embodied on a non-transitory computer readable medium of claim 1, further comprising:
   displaying the message personalized for an intended recipient on the visual file that is transmitted to the intended recipient.

4. The computer program product embodied on a non-transitory computer readable medium of claim 1, wherein the user interface is one of a graphical user interface and an audio interface.

5. The computer program product embodied on a non-transitory computer readable medium of claim 1, wherein the personalized message is played as an audio message of for the intended recipient.

6. The computer program product embodied on a non-transitory computer readable medium of claim 1, wherein the audio and visual files are categorized and searchable according to at least one of text information, artist, genre, and emotion.

7. The computer program product embodied on a non-transitory computer readable medium of claim 1, further comprising:
   uploading content from a user to the database of pre-existing audio and visual files.

8. The computer program product embodied on a non-transitory computer readable medium of claim 7, further comprising:
   tagging metadata to the uploaded content.

9. The computer program product embodied on a non-transitory computer readable medium of claim 8, wherein the metadata is generated by the user after the content is uploaded.

10. The computer program product embodied on a non-transitory computer readable medium of claim 8, wherein the metadata is automatically generated by the audio extraction engine and is based on the characteristics of the uploaded content.

11. The computer program product embodied on a non-transitory computer readable medium of claim 1, further comprising:
    accessing the software-as-a-service program through an icon embedded in a messenger program.

12. The computer program product embodied on a non-transitory computer readable medium of claim 1, further comprising:
    an embedded link in the at least one audio and visual file that directs the intended recipient to at least one of audio and video data associated with the at least one audio and visual file.

13. The computer program product embodied on a non-transitory computer readable medium of claim 12, wherein the at least one of audio and video data associated with the at least one audio and visual file is a complete version of the at least one audio and visual file.

14. The computer program product embodied on a non-transitory computer readable medium of claim 1, further comprising:
    editing at least one of the plurality of pre-existing audio and visual files.

15. The computer program product embodied on a non-transitory computer readable medium of claim 14, further comprising:
    editing the length of the at least one of the plurality of pre-existing audio and visual files.

16. The computer program product embodied on a non-transitory computer readable medium of claim 14, further comprising:
    editing at least one of the plurality of pre-existing audio and visual files by combining more than one audio or visual file with at least one other audio or visual file.

17. The computer program product embodied on a non-transitory computer readable medium of claim 14, further comprising:
    delivering the amended file as a message of at least one of audio and visual data to a plurality of recipients.

* * * * *